(12) United States Patent
Kaibe et al.

(10) Patent No.: US 11,174,924 B2
(45) Date of Patent: Nov. 16, 2021

(54) BALL SCREW

(71) Applicant: Kuroda Precision Industries Ltd., Kanagawa (JP)

(72) Inventors: Ryo Kaibe, Kisarazu (JP); Hitoshi Hakogi, Kimitsu (JP); Yoshimi Iwasaki, Ichihara (JP); Tatsuto Omori, Asahi (JP)

(73) Assignee: KURODA PRECISION INDUSTRIES LTD., Kawasaki (JP)

( * ) Notice: Subject to any disclaimer, the term of this patent is extended or adjusted under 35 U.S.C. 154(b) by 92 days.

(21) Appl. No.: 16/608,940

(22) PCT Filed: Dec. 25, 2017

(86) PCT No.: PCT/JP2017/046403
§ 371 (c)(1),
(2) Date: Oct. 28, 2019

(87) PCT Pub. No.: WO2019/130385
PCT Pub. Date: Jul. 4, 2019

(65) Prior Publication Data
US 2020/0191246 A1   Jun. 18, 2020

(51) Int. Cl.
*F16H 1/24* (2006.01)
*F16H 55/02* (2006.01)
*F16H 25/22* (2006.01)

(52) U.S. Cl.
CPC ............................... *F16H 25/2214* (2013.01)

(58) Field of Classification Search
CPC .................... F16H 25/2219; F16H 25/2214
See application file for complete search history.

(56) References Cited

U.S. PATENT DOCUMENTS 5,664,459 A * 9/1997 Muhleck ............. F16H 25/2219
74/424.87
7,487,692 B2   2/2009 Lin et al.
(Continued)

FOREIGN PATENT DOCUMENTS

CH          685513       7/1995
DE        10318388      11/2004
(Continued)

OTHER PUBLICATIONS

Japanese Office Action for JP2017247534, 10 pages.
(Continued)

*Primary Examiner* — Jake Cook
(74) *Attorney, Agent, or Firm* — Dority & Manning, P.A.

(57) ABSTRACT

An end deflector includes a main portion including a ball delivery path that delivers balls between a rolling path and a ball return path, a tongue portion that guides the balls from the rolling path to the ball delivery path, and a pair of protruding pieces, that extend in the circumferential direction of each nut body from either side of the tongue portion with respect to the axial direction and define a ball guide groove that extends between the ball delivery path and the rolling path in cooperation with an inner circumferential surface of a deflector holding recess formed in a nut body, the main portion has an outer circumferential surface which opposes an inner circumferential surface of the deflector holding recess in the radial direction, a front-side portion of the outer circumferential surface with respect to a direction of insertion into the deflector holding recess is offset inward in the radial direction, and at least a rear-side portion of the outer circumferential surface with respect to the direction of insertion into the deflector holding recess is fitted to the inner circumferential surface of the deflector holding recess.

12 Claims, 30 Drawing Sheets

(56) References Cited

U.S. PATENT DOCUMENTS

| | | | | |
|---|---|---|---|---|
| 7,562,599 B2* | 7/2009 | Chen | ............... | F16H 25/2214 |
| | | | | 74/424.71 |
| 7,810,406 B2* | 10/2010 | Chen | ............... | F16H 25/2219 |
| | | | | 74/424.86 |
| 7,845,251 B2* | 12/2010 | Wu | ............... | F16H 25/2219 |
| | | | | 74/424.86 |
| 8,261,627 B2* | 9/2012 | Miyahara | ............ | F16H 25/2219 |
| | | | | 74/424.86 |
| 8,813,596 B2* | 8/2014 | Chen | ............... | F16H 25/2219 |
| | | | | 74/424.82 |
| 9,464,705 B2* | 10/2016 | Iwasaki | ............. | F16H 25/2219 |
| 2004/0211280 A1 | 10/2004 | Nishimura et al. | | |
| 2006/0248974 A1 | 11/2006 | Scholz | | |
| 2007/0295133 A1* | 12/2007 | Chen | ............... | F16H 25/2219 |
| | | | | 74/424.87 |
| 2008/0110286 A1 | 5/2008 | Nishimura et al. | | |
| 2008/0190231 A1 | 8/2008 | Chiu et al. | | |
| 2009/0249911 A1 | 10/2009 | Michioka et al. | | |
| 2010/0236345 A1 | 9/2010 | Miyahara et al. | | |
| 2011/0154926 A1 | 6/2011 | Lee | | |
| 2015/0151780 A1 | 6/2015 | Fujita et al. | | |
| 2017/0370454 A1* | 12/2017 | Nakamura | ............... | F16H 25/24 |

FOREIGN PATENT DOCUMENTS

| | | |
|---|---|---|
| DE | 102005021213 | 11/2006 |
| DE | 10297160 | 11/2015 |
| FR | 1398059 | 5/1965 |
| JP | 2003269565 | 9/2003 |
| JP | 2007024305 | 2/2007 |
| JP | 2013174316 | 9/2013 |
| JP | 2014016039 | 1/2014 |
| JP | 2014077459 | 5/2014 |
| JP | 2015016039 | 1/2015 |
| JP | 2015105710 | 6/2015 |
| JP | 2016061370 | 4/2016 |
| WO | WO2006046636 | 5/2006 |
| WO | WO2009057424 | 5/2009 |

OTHER PUBLICATIONS

United States Office Action for U.S. Appl. No. 16/211,860, dated Aug. 8, 2019, 8 pages.

Office Action for German Patent Application No. 10 2018 131 064.1 dated Sep. 11, 2019, 13 pages.

International Search Report for PCT/JP2017/046403 dated Feb. 27, 2018, 4 pages.

* cited by examiner ure of the deflector holding recess, the protruding pieces may likely be damaged by hitting the nut body when the end deflector is assembled to the nut body, thereby causing the yield to decrease.
BALL SCREW

CROSS REFERENCE TO RELATED APPLICATIONS

This application is the U.S. National Stage entry of International Application Number PCT/JP2017/046403 filed under the Patent Cooperation Treaty having a filing date of Dec. 25, 2017.

TECHNICAL FIELD

The present invention relates to a ball screw, and more specifically, to a ball screw including an end deflector attached to a nut body.

BACKGROUND ART

As a ball screw used for a linear movement mechanism or the like, there is known a ball screw that includes: a screw shaft having an outer circumferential surface on which a shaft thread groove is formed; a nut body having an inner circumferential surface on which a nut thread groove is formed to oppose the shaft thread groove to define a rolling path in cooperation with the shaft thread groove, a ball return path extending in an axial direction, and an end face provided with a deflector holding recess which is continuous with the nut thread groove and in which an axial end of the ball return path opens; a plurality of balls rotatably accommodated in the rolling path and the ball return path; an end deflector inserted into the deflector holding recess and having a ball delivery path for delivering the balls between the rolling path and the ball return hole and a tongue portion that guides the balls from the rolling path to the ball delivery path; and a mounting screw that penetrates the end deflector in the axial direction and threadedly engages with the nut body to fix the end deflector to the nut body (e.g., Patent Literatures 1 to 4).

CITATION LIST

Patent Literature

Patent Literature 1: Japanese Patent Application Laid-Open No. 2007-24305
Patent Literature 2: Japanese Patent Application Laid-Open No. 2013-174316
Patent Literature 3: Japanese Patent Application Laid-Open No. 2014-16039
Patent Literature 4: Japanese Patent Application Laid-Open No. 2014-77459

SUMMARY OF INVENTION

Technical Problem

When the fitting gap between the deflector holding recess and the end deflector is reduced in order to improve the accuracy of the assembly position of the end deflector with respect to the nut body, the workability of aligning and inserting the end deflector into the deflector holding recess deteriorates.

As described in Patent Literature 4, in the case of the end deflector provided with a pair of protruding pieces that extend in the circumferential direction of the nut body from either side of the tongue portion with respect to the axial direction to define a ball guide groove extending between the ball delivery path and the rolling path in cooperation with the inner circumferential surface of the deflector holding recess, the protruding pieces may likely be damaged by hitting the nut body when the end deflector is assembled to the nut body, thereby causing the yield to decrease.

The problem to be solved by the present invention is to improve the workability of assembling an end deflector to a nut body in a ball screw and avoid a decrease in the yield while ensuring the accuracy of assembling the end deflector to the nut body.

Solution to Problem

A ball screw according to one embodiment of the present invention includes: a screw shaft having an outer circumferential surface on which a shaft thread groove is formed; a nut body having an inner circumferential surface on which a nut thread groove is formed to oppose the shaft thread groove to define a rolling path in cooperation with the shaft thread groove, a ball return path extending in an axial direction, and an end face provided with a deflector holding recess in which an axial end of the ball return path opens; a plurality of balls rotatably accommodated in the rolling path and the ball return path; and an end deflector inserted into the deflector holding recess, wherein the end deflector has a main portion comprising a ball delivery path that delivers the balls between the rolling path and the ball return path, a tongue portion that guides the balls from the rolling path to the ball delivery path, and a pair of protruding pieces that extend in the circumferential direction of the nut body from either side of the tongue portion with respect to the axial direction and define a ball guide groove that extends between the ball delivery path and the rolling path in cooperation with an inner circumferential surface of the deflector holding recess, and the main portion has an outer circumferential surface opposing an inner circumferential surface of the deflector holding recess in a radial direction, a front-side portion of the outer circumferential surface with respect to a direction of insertion into the deflector holding recess is offset inward in the radial direction of the main portion, and at least a rear-side portion of the outer circumferential surface with respect to the direction of insertion into the deflector holding recess is fitted to the inner circumferential surface of the deflector holding recess.

According to this configuration, the insertion of the end deflector into the deflector holding recess is performed by first inserting the front-side portion of the outer circumferential surface of the main portion into the rear-side portion of the inner circumferential surface of a main portion receiving portion, and therefore, the insertion starts with a loosely engaged state with a gap in the radial direction. Thereby, the workability of aligning and inserting the main portion of the end deflector into the main portion receiving portion of the deflector holding recess is improved, and the protruding pieces, which are cantilevers, are less likely to hit the nut body during the assembling work so that the protruding pieces are less likely to be damaged during assembling.

The end deflector of the present embodiment may be either a resin molded product or a metallic product formed by casting or the like.

In the above-described ball screw, preferably, the outer circumferential surface of the main portion is a surface that is straight in the axial direction, and the front-side portion of the main portion with respect to the insertion direction is offset inward in the radial direction of the main portion via a shoulder portion, and the shoulder portion is located at a position in the axial direction not including a base portion of one of the pair of protruding pieces located on a front side with respect to the insertion direction.

According to this configuration, an external force caused by the fitting of the end deflector into the deflector holding recess is less likely to act on the protruding piece on the front side with respect to the insertion direction.

In the above-described ball screw, preferably, the inner circumferential surface of the deflector holding recess is a surface that is straight in the axial direction and has a shoulder portion formed at a same axial position as that of the shoulder portion of the main portion, and a front-side portion of the inner circumferential surface of the deflector holding recess with respect to the insertion direction is offset inward in the radial direction of the deflector holding recess.

According to this configuration, even when a large external force acts on the end deflector, the protruding pieces are prevented from being offset.

In the above-described ball screw, preferably, the end deflector includes a flange portion provided at an axial end portion of the main portion and is fixed to the nut body by a mounting screw that passes through the flange portion in the axial direction and threadedly engages with the nut body.

According to this configuration, the tightening force of the mounting screw acts on the flange portion only, and therefore, the first portion and the second recess are prevented from deforming, and the deterioration in the positional accuracy of the ball delivery path and the tongue portion with respect to the nut body is suppressed.

In the above-described ball screw, preferably, the end deflector includes a rib portion that extends from a radially inner edge of the flange portion in a direction toward a depth side of the deflector holding recess.

This configuration improves the bending rigidity of the flange portion and prevents the positional accuracy of the ball delivery path and the tongue portion with respect to the nut body from deteriorating.

In the above-described ball screw, preferably, the flange portion includes a radial flange portion that extends outward in the radial direction from the end portion of the main portion and includes a portion integrated with one of the pair of protruding pieces located on a flange portion side and a circumferential flange portion that extends from the end portion of the main portion in a circumferential direction opposite to a protruding direction of the protruding piece, and the rib portion is provided on the circumferential flange portion.

According to this configuration, the radial flange portion and the protruding pieces mutually act as reinforcement ribs such that the bending rigidity of these portions is mutually enhanced, while the bending rigidity of the circumferential flange portion is enhanced by the rib portion.

In the above-described ball screw, preferably, the rib portion includes a portion that planarly overlaps the inner circumferential surface of the nut body in the radial direction.

This configuration further enhances the bending rigidity of the flange portion and prevents the positional accuracy of the ball delivery path and the tongue portion with respect to the nut body from deteriorating.

Advantageous Effects of Invention

According to the ball screw of the present invention, it is possible to improve the workability of assembling the end deflector to the nut body and avoid a decrease in the yield while ensuring the accuracy of assembling the end deflector to the nut body.

DESCRIPTION OF EMBODIMENTS

Hereinafter, Embodiment 1 of a ball screw according to the present invention will be described with reference to FIGS. 1 to 8.

Figure 1:
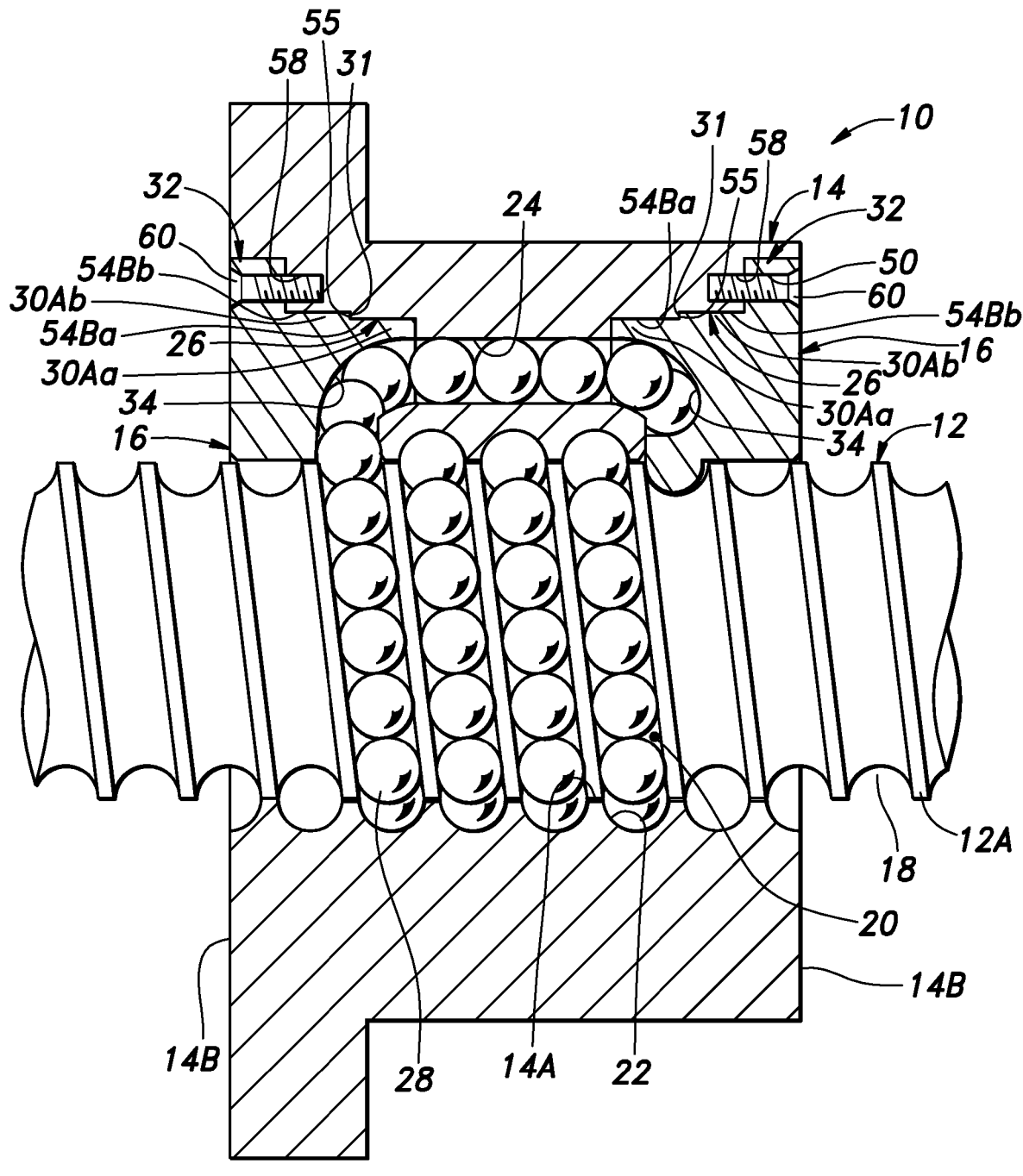
FIG. 1 is a longitudinal cross-sectional view schematically illustrating Embodiment 1 of a ball screw according to the present invention.
Figure 2:
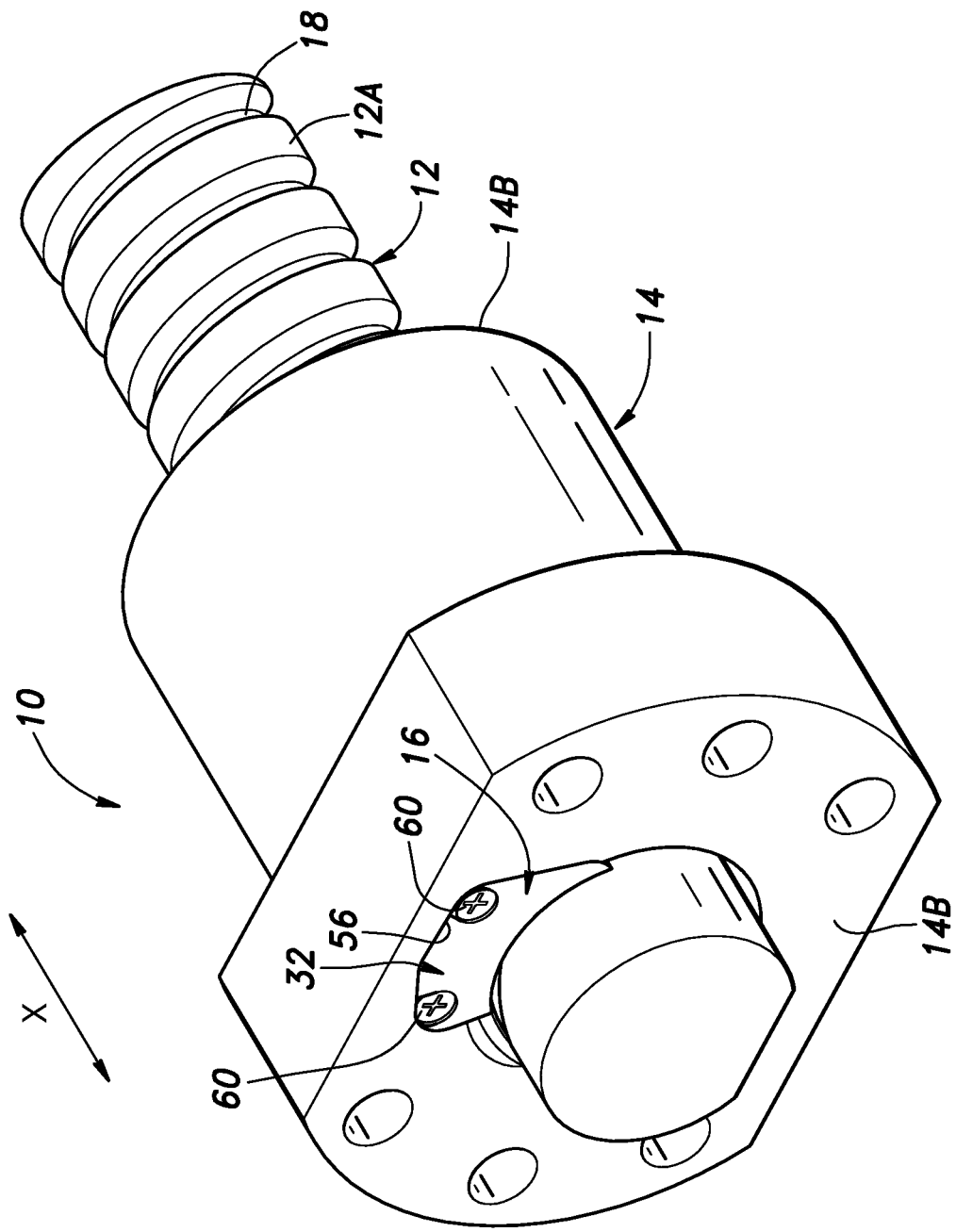
FIG. 2 is a perspective view of the ball screw of Embodiment 1.

As shown in FIG. 1, a ball screw 10 of Embodiment 1 includes a screw shaft 12, a nut body 14, and two end deflectors 16.

Here, the direction of the central axis of the ball screw 10 is defined as an axial direction X. The axial direction X is a right-left direction as viewed in FIG. 1. A circumferential direction referred to below is a direction around the central axis of the ball screw 10.

The screw shaft 12 is constituted of a round rod body made of metal and has an outer circumferential surface 12A on which a shaft thread groove 18 is formed.

The nut body 14 is constituted of a cylindrical body made of metal, and has an inner circumferential surface 14A on which a nut thread groove 22 is formed to oppose the shaft thread groove 18 to define a rolling path 20 in cooperation with the shaft thread groove 18, a ball return path 24 extending in the axial direction X through a cylindrical wall thereof, and end faces 14B on either side with respect to the axial direction X each having a deflector holding recess 26 formed therein, such that the end deflectors 16 are inserted into the respective deflector holding recesses 26.

A plurality of metal balls 28 are accommodated in the rolling path 20 and the ball return path 24 so as to roll therein.

Next, details of the end deflector 16, the deflector holding recess 26, and a mounting structure of the end deflector 16 will be described with reference to FIGS. 2 to 8.

Each end deflector 16 is a single molded product made of resin such as polyacetal (POM), polyetheretherketone (PEEK), polyphenylene sulfide (PPS), and polyamide (PA), and includes a main portion 30 and a flange portion 32 provided on one end portion (this one end portion may be referred to as an "outer end portion") of the main portion 30 with respect to the axial direction X.

The main portion 30 includes a ball guide groove 34 curved so as to include an axial portion 34A and a circumferential portion 34B to define a ball delivery path 36 having a closed cross section (see FIG. 3) in cooperation with an inner circumferential surface 54B, which will be described later, of the deflector holding recess 26, a tongue portion 38 that extends in the circumferential direction from a distal end of the circumferential portion 34B and bulges inward in the radial direction so as to enter into the a corresponding part of the shaft thread groove 18, and a pair of protruding pieces 42 and 44 extending substantially parallel to each other in the circumferential direction of the nut body 14 from either side of the tongue portion 38 with respect to the axial direction X.

The protruding pieces 42 and 44 are individual cantilevers formed to have base ends on the side of the tongue portion 38 and to be spaced apart from each other in the axial direction X, and define a ball guide groove 40 (see FIG. 3) continuous to the ball guide groove 34 in cooperation with the later-described inner circumferential surface 54B of the deflector holding recess 26. The ball guide groove 40 extends between the ball delivery path 36 and the rolling path 20 and delivers the balls 28 between the ball delivery path 36 and the rolling path 20 so as to form an extension portion of the rolling path 20 in cooperation with the shaft thread groove 18. The tongue portion 38 guides the balls 28 from the ball guide groove 40 to the ball delivery path 36 in such a way as to scoop up the balls 28 from the ball guide groove 40.

The ball guide groove 40 forms a rolling path for the balls 28 connecting the rolling path 20 and the ball delivery path 36 in cooperation with a part of the shaft thread groove 18 of the screw shaft 12 located at the corresponding position. The protruding pieces 42 and 44 include inner circumferential surfaces 42A and 44A respectively formed of circumferential arc surfaces and are shaped to avoid interference with the screw shaft 12.

The main portion 30 has an outer circumferential surface 30A that opposes the inner circumferential surface 54B of the deflector holding recess 26 in the radial direction. The outer circumferential surface 30A is a surface that is straight in the axial direction and includes a shoulder portion (stepped portion) 31 at an intermediate portion thereof with respect to the axial direction. The shoulder portion 31 is formed to extend over the entirety of the outer circumferential surface 30A in the circumferential direction at a position in the axial direction not including a base portion (proximal end) of the protruding piece 44 provided on the front side of the main portion 30 with respect to an insertion direction Xi (see FIGS. 4 to 8) into the deflector holding recess 26, in other words, at a position on the side of the flange portion 32 not overlapping the protruding piece 44 as viewed in the axial direction. Of the outer circumferential surface 30A, a front-side portion 30Aa located on the front side of the shoulder portion 31 (distal end side) with respect to the insertion direction Xi is offset radially inward of the main portion 30 compared to a rear-side portion 30Ab located on the rear side (flange portion 32 side) of the shoulder portion 31 with respect to the insertion direction Xi.

The flange portion 32 is a mounting piece of the end deflector 16 with respect to the nut body 14 and consists of a brim-like portion extending radially outward and circumferentially from an axial end portion of the main portion 30 on the side corresponding to the opening edge of the deflector holding recess 26 in the end face 14B, that is, the outer end portion of the main portion 30.

More specifically, the flange portion 32 includes a radial flange portion 46 that extends outward in the radial direction from the outer end portion of the main portion 30 and includes a portion integrated with substantially the entire protruding piece 42 and a circumferential flange portion 48 extending from the outer end portion of the main portion 30 in the circumferential direction opposite to the protruding direction of the protruding piece 42. The radial flange portion 46 and the circumferential flange portion 48 are each provided with a screw passage hole (through hole) 50 extending therethrough in the axial direction X. The circumferential flange portion 48 includes an inner circumferential surface 48A made of a circumferential arc surface continuous to the inner circumferential surface 42A of the protruding piece 42 and is shaped to avoid interference with the screw shaft 12.

The radial flange portion 46 serves as the aforementioned mounting piece as well as a reinforcement rib for enhancing the bending rigidity of the protruding piece 42 extending in the circumferential direction. In other words, the protruding piece 42 is located on a radially inner edge of the radial flange portion 46 and serves as a reinforcement rib for enhancing the bending rigidity of the radial flange portion 46. Thus, the radial flange portion 46 and the protruding piece 42 mutually act as the reinforcement ribs.

The end deflector 16 includes a rib portion 52 that extends from the radially inner edge of the circumferential flange portion 48 toward the inward side in the axial direction X and along an inner circumferential surface 48A. Note that the inward side in the axial direction X refers to a side opposite to the outer end portion in the axial direction X, that is, a depth side of the deflector holding recess 26 on the corresponding side in the axial direction X.

Figure 3:
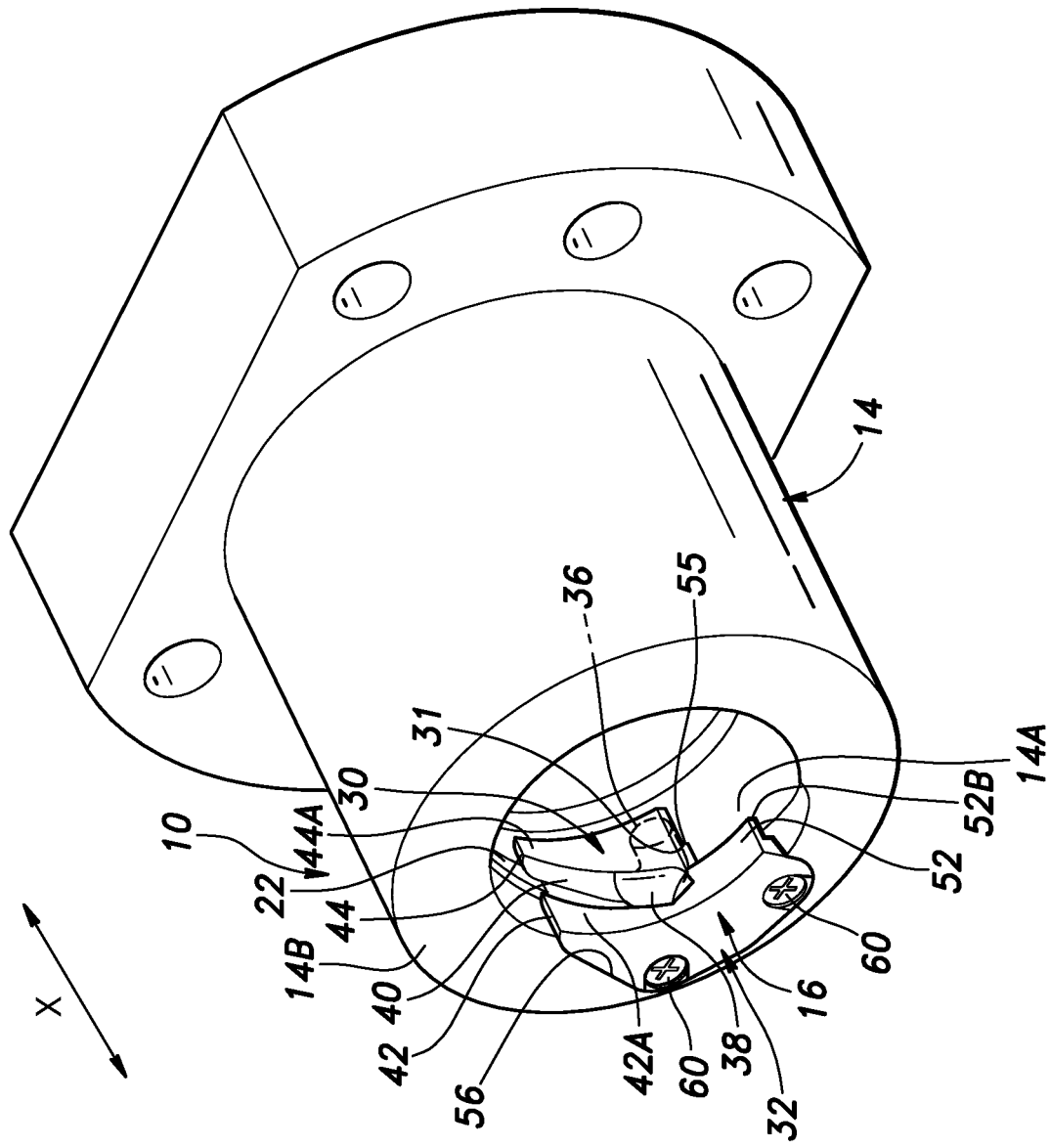
FIG. 3 is a perspective view of the ball screw of Embodiment 1 with a screw shaft removed.

The rib portion 52 is a reinforcement rib for enhancing the bending rigidity of the circumferential flange portion 48, is connected to the main portion 30 at a circumferential end portion thereof, includes an inner circumferential surface 52A (see FIG. 6) consisting of a circumferential arc surface continuous to the inner circumferential surface 48A of the circumferential flange portion 48, and is shaped to avoid interference with the screw shaft 12. As shown in FIG. 3, the rib portion 52 includes an overlapping portion 52B that planarly overlaps the inner circumferential surface 14A of the nut body 14 in the radial direction.

Each deflector holding recess 26 includes a main portion receiving portion 54 formed in substantially the same shape as the contour shape of the main portion 30 so as to receive the main portion 30 and a flange receiving portion 56 located more on the outer end portion side than the main portion receiving portion 54 in the axial direction X and formed in substantially the same shape as the contour shape of the flange portion 32 so as to receive the flange portion 32.

Figure 4:
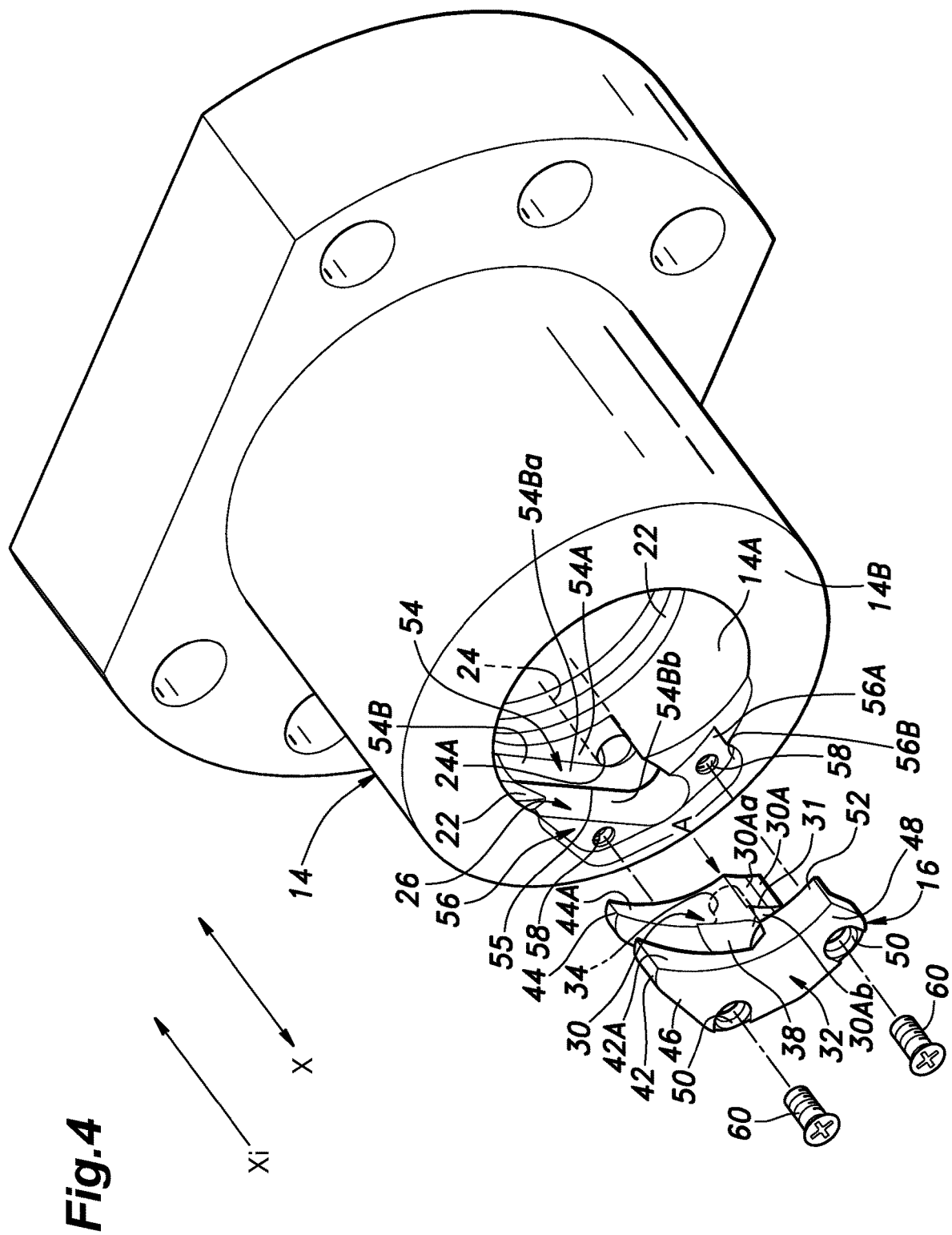
FIG. 4 is an exploded perspective view of the ball screw of Embodiment 1 with the screw shaft removed.
Figure 5:
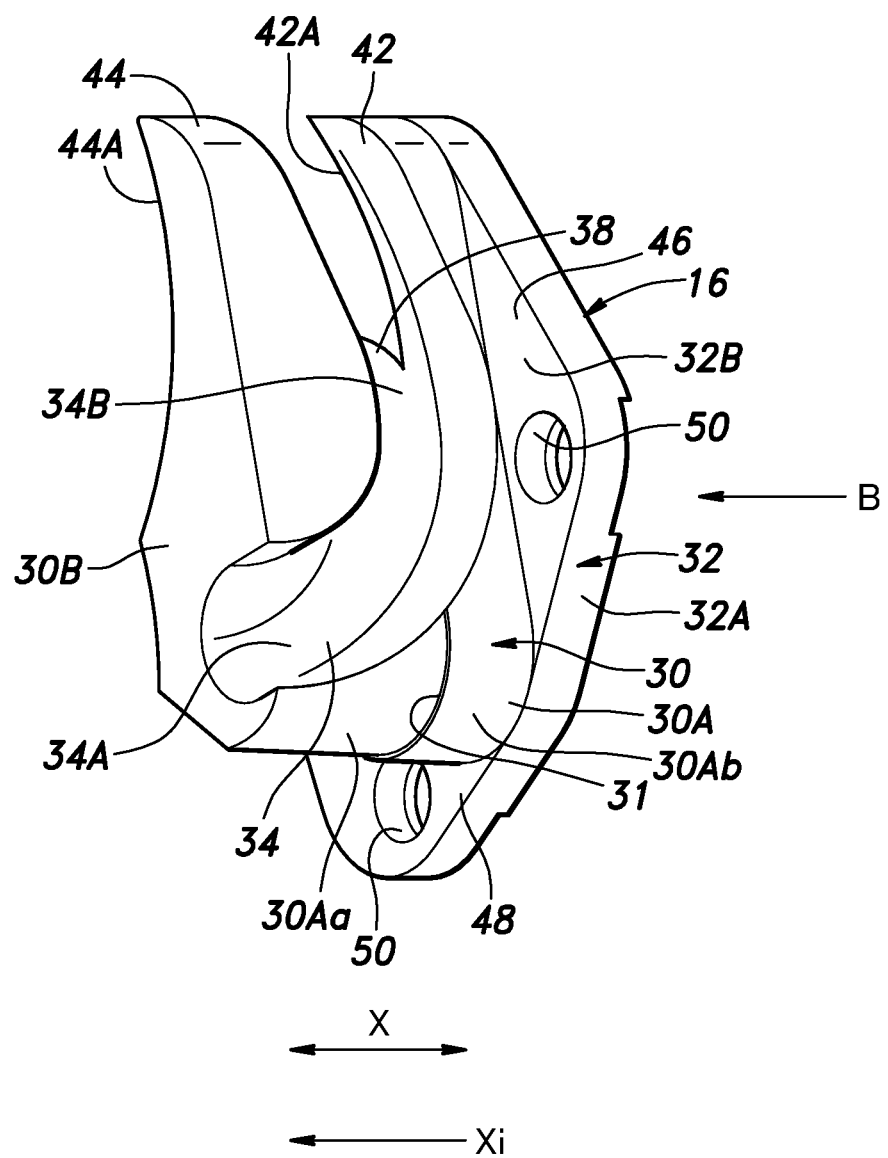
FIG. 5 is an enlarged perspective view of an end deflector of the ball screw of Embodiment 1 (enlarged perspective view as viewed in the direction of an arrow A in FIG. 4).
Figure 6:
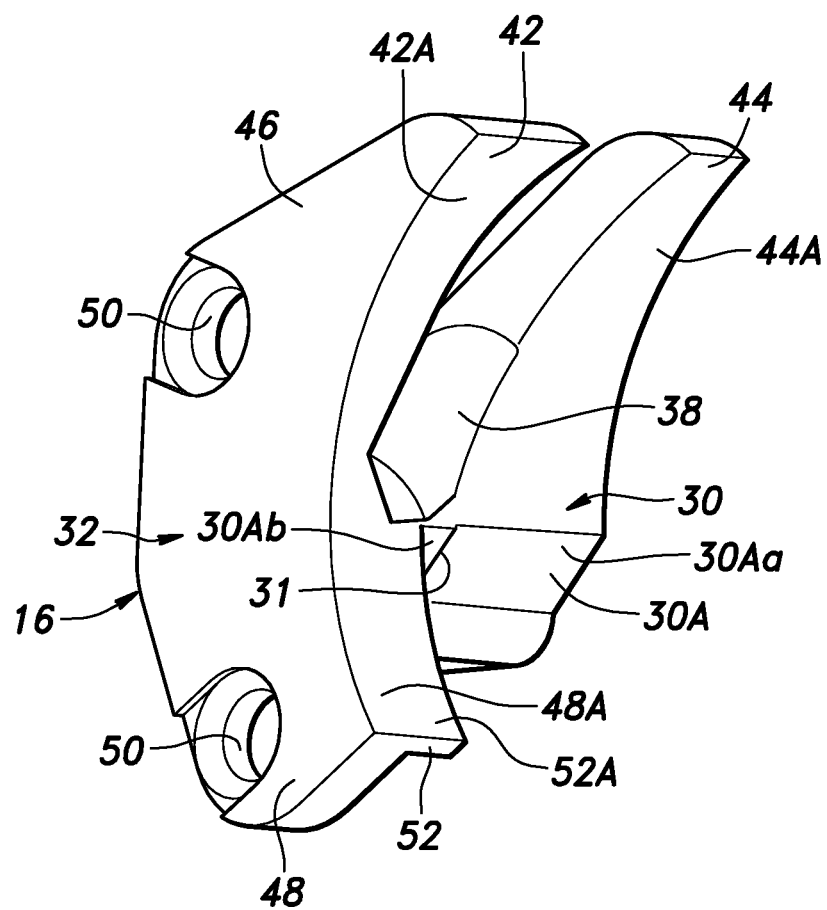
FIG. 6 is an enlarged perspective view of the end deflector of the ball screw of Embodiment 1 (enlarged perspective view as viewed in the direction of an arrow B in FIG. 5).
Figure 7:
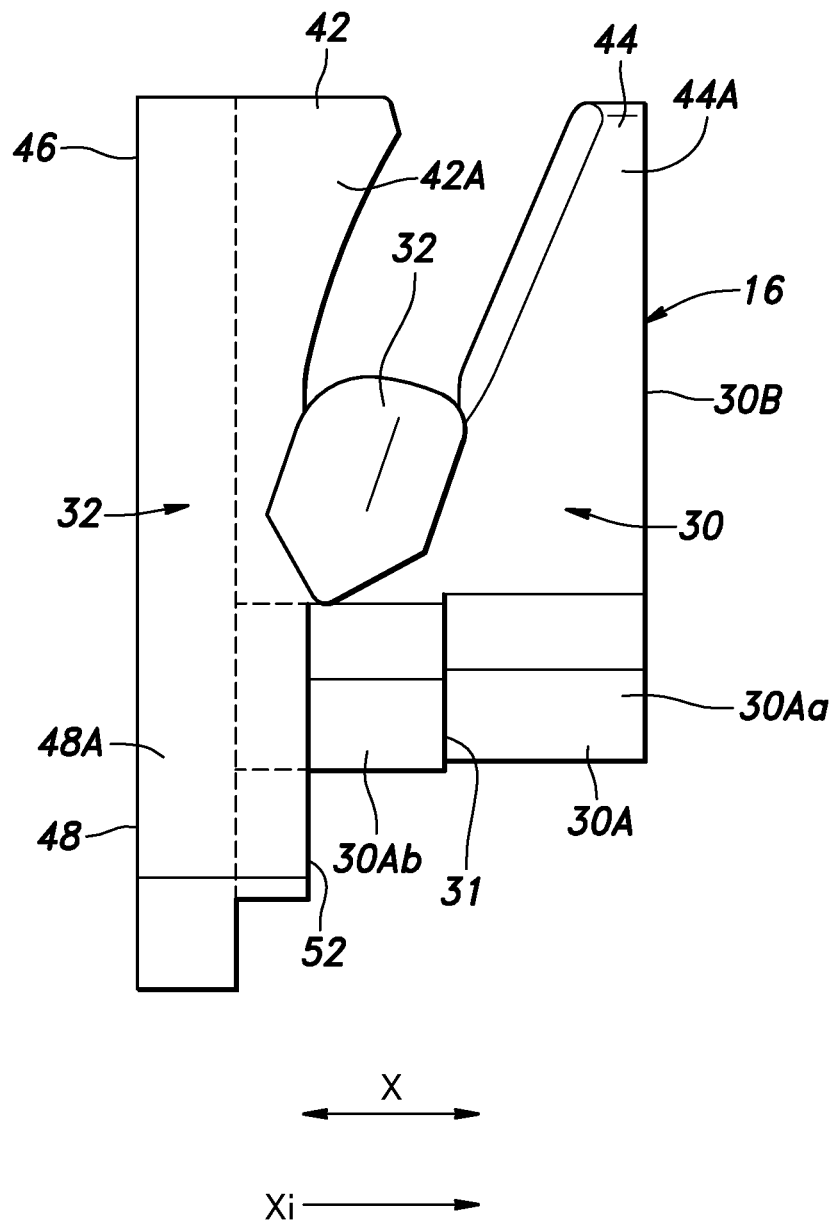
FIG. 7 is a left side view of the end deflector of the ball screw of Embodiment 1.
Figure 8:
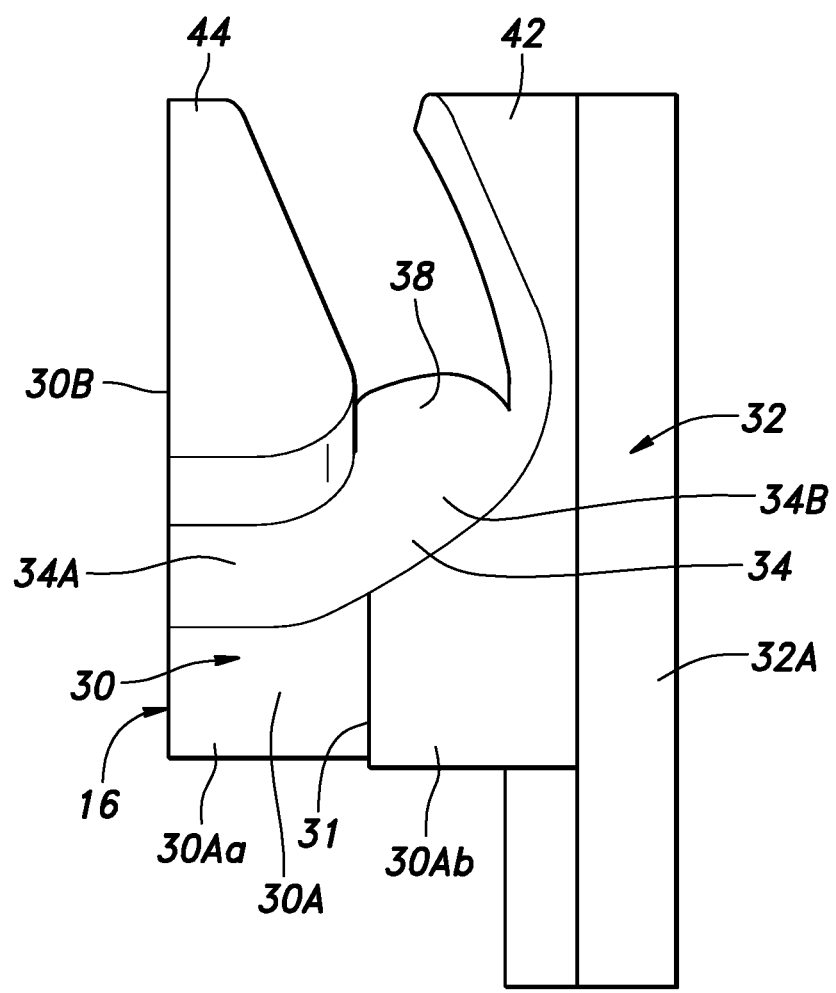
FIG. 8 is a right side view of the end deflector of the ball screw of Embodiment 1.
Figure 9:
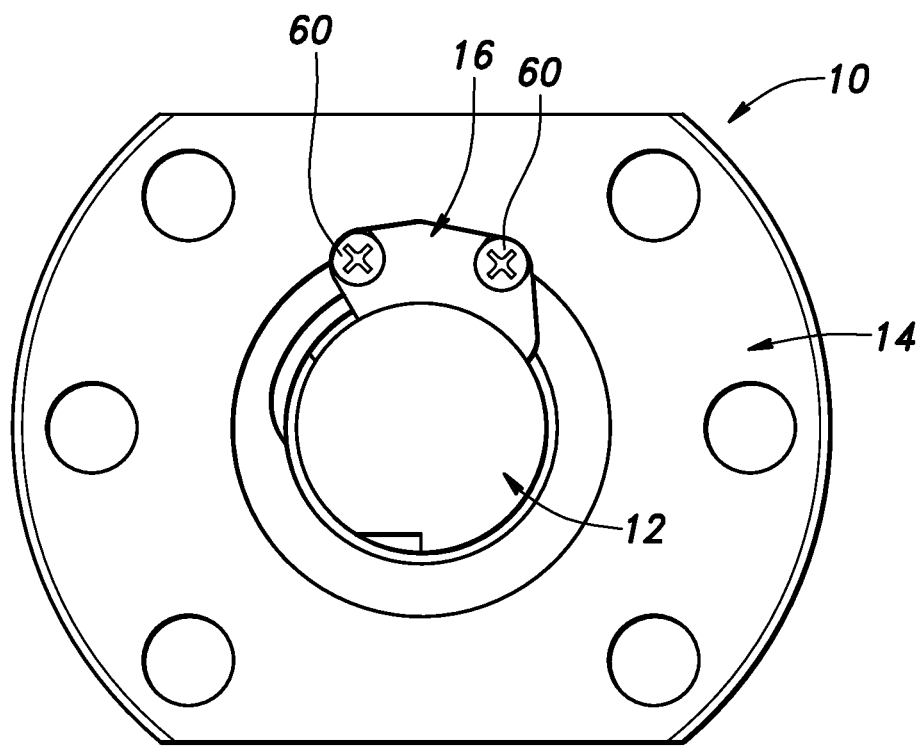
FIG. 9 is a front view of a ball screw according to Embodiment 2.
Figure 10:
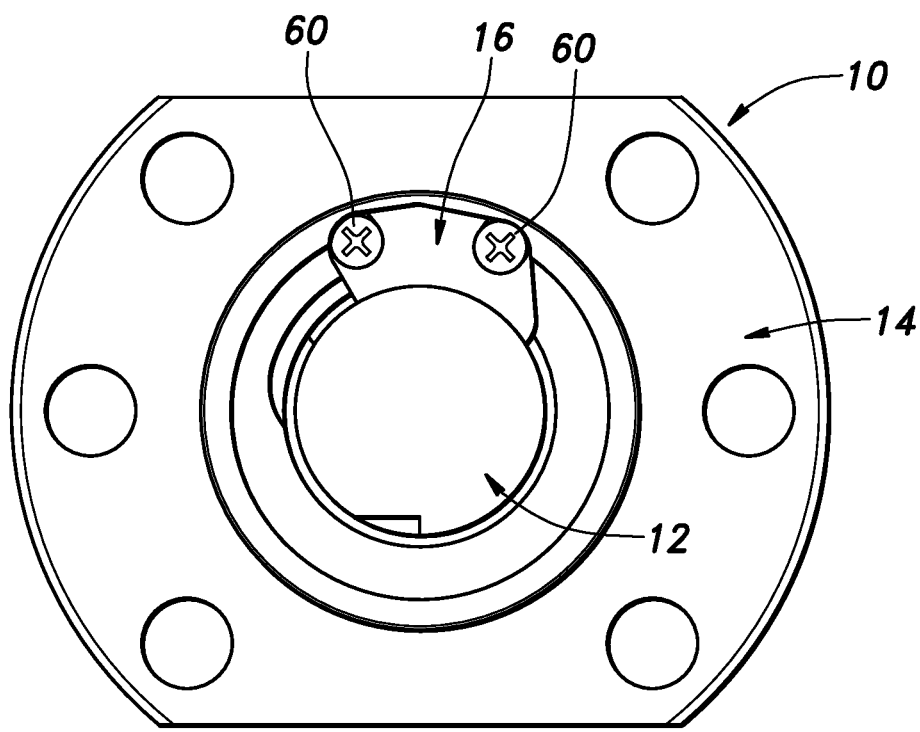
FIG. 10 is a rear view of the ball screw of Embodiment 2.
Figure 11:
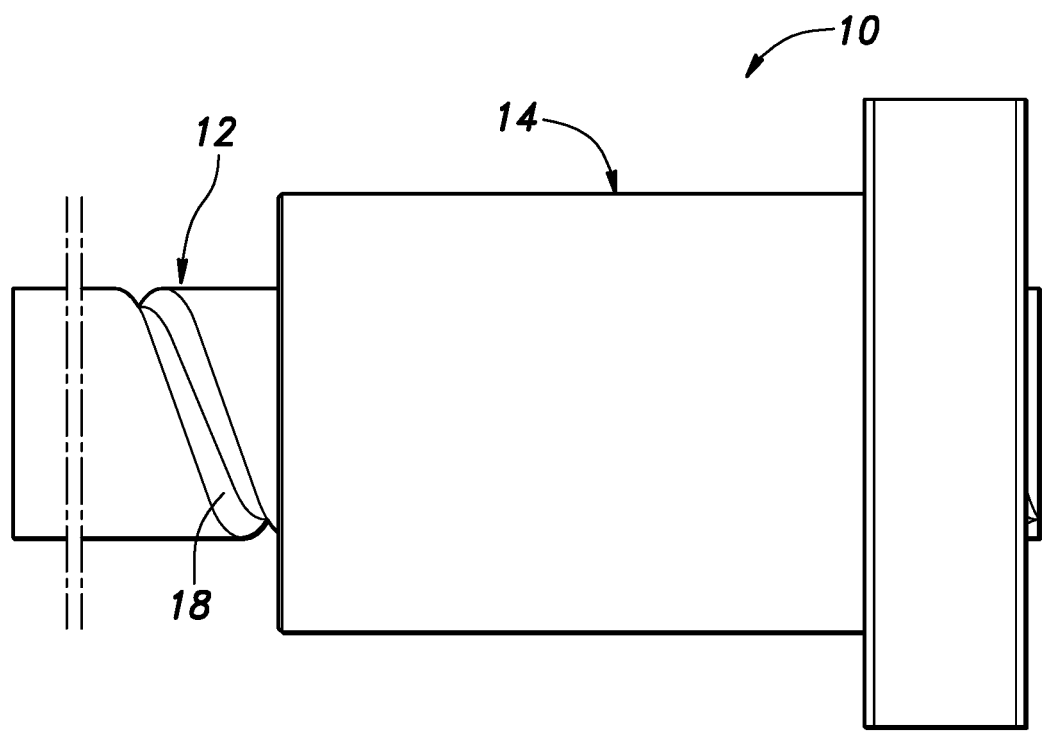
FIG. 11 is a left side view of the ball screw of Embodiment 2.
Figure 12:
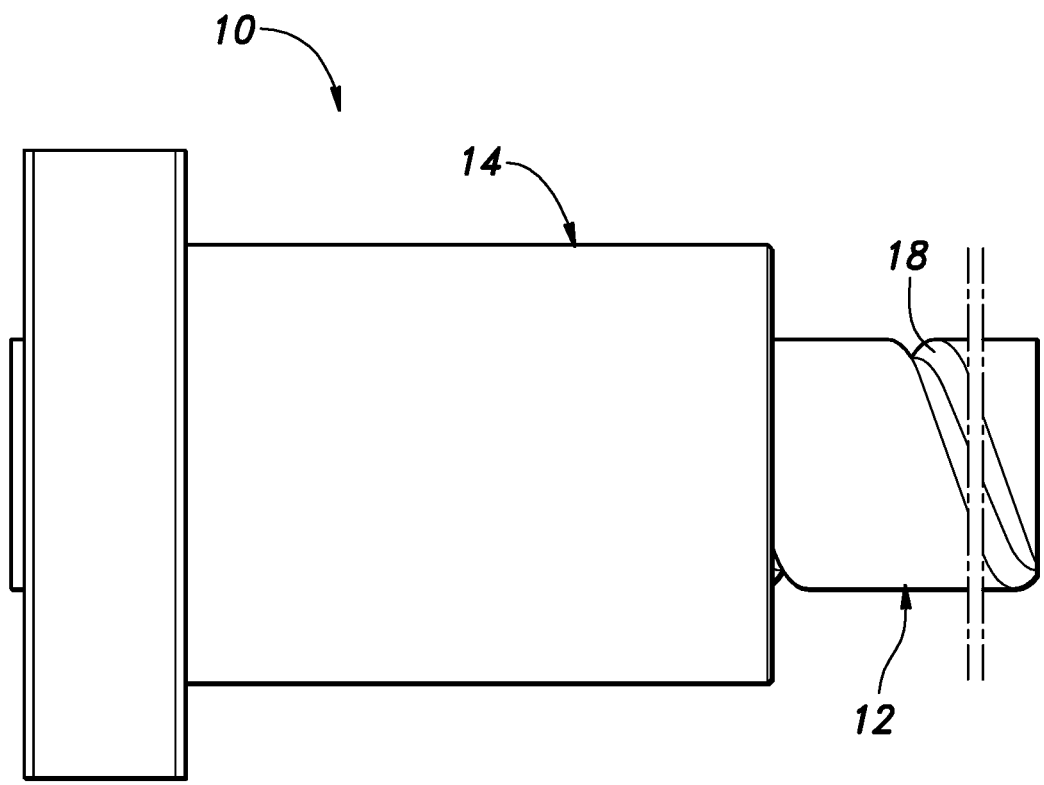
FIG. 12 is a right side view of the ball screw of Embodiment 2.
Figure 13:
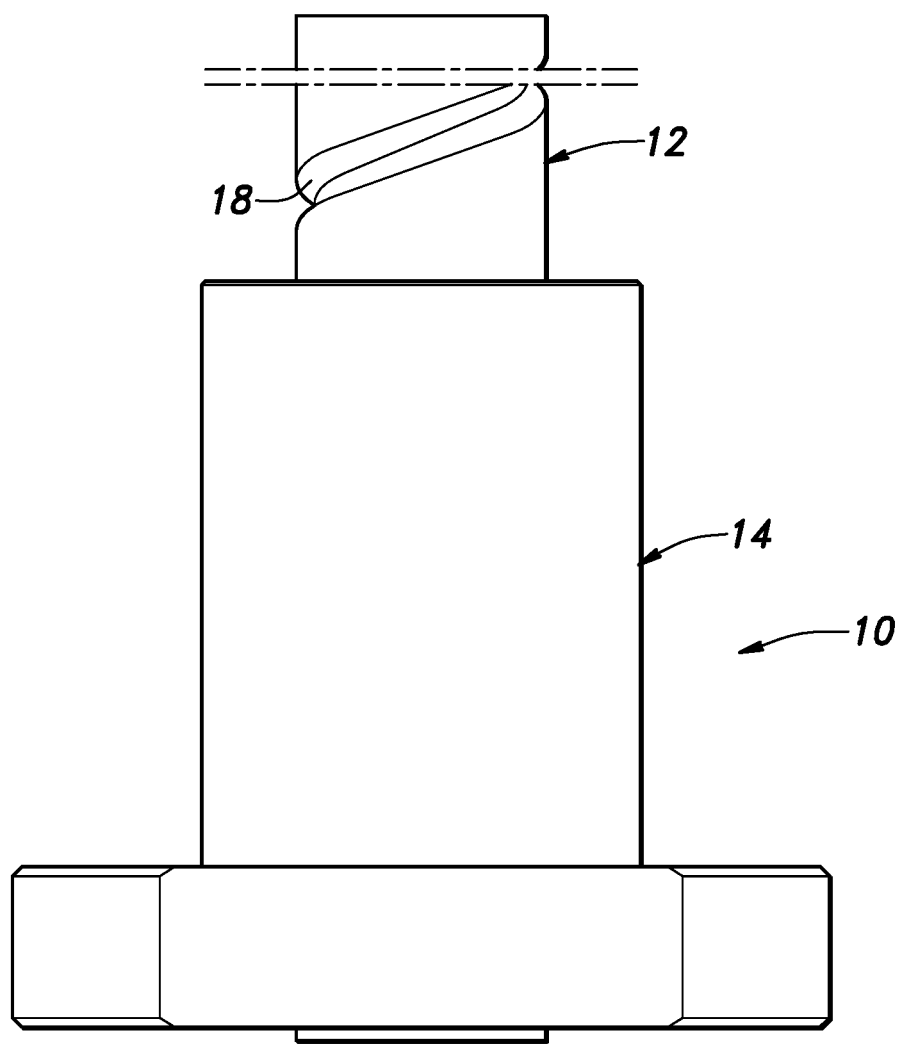
FIG. 13 is a plan view of the ball screw of Embodiment 2.
Figure 14:
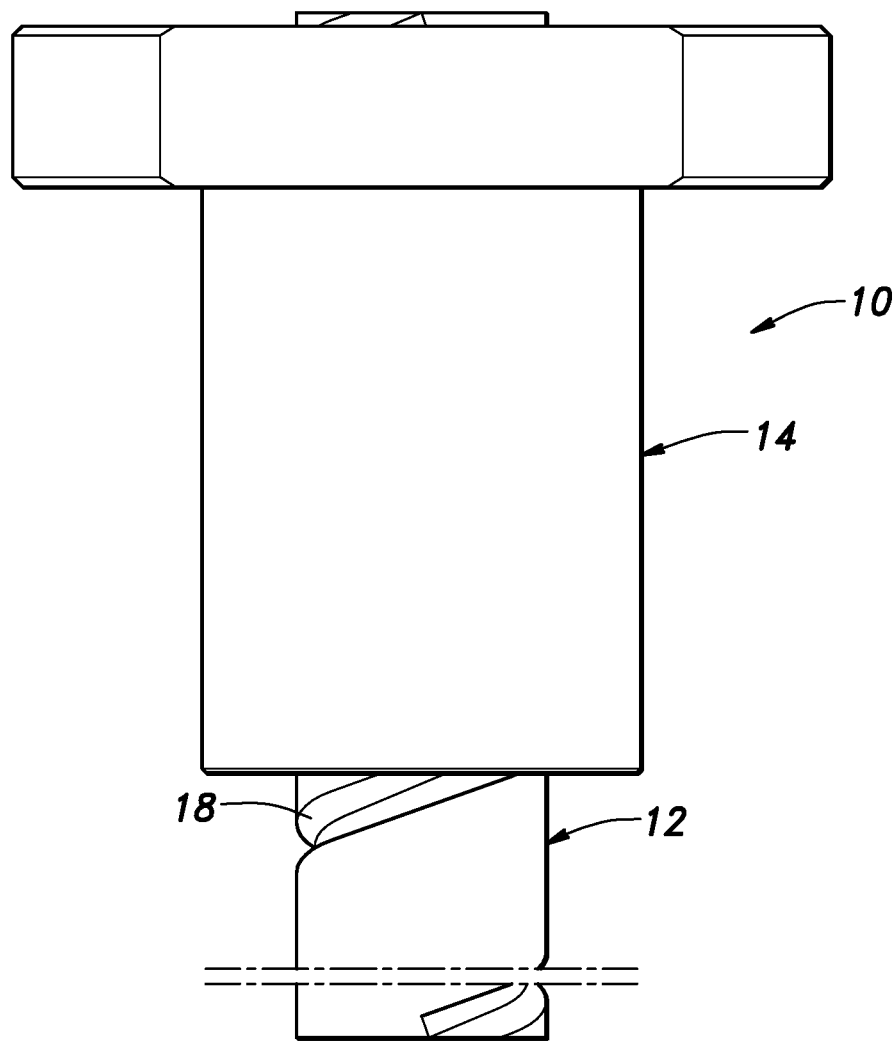
FIG. 14 is a bottom view of the ball screw of Embodiment 2.
Figure 15:
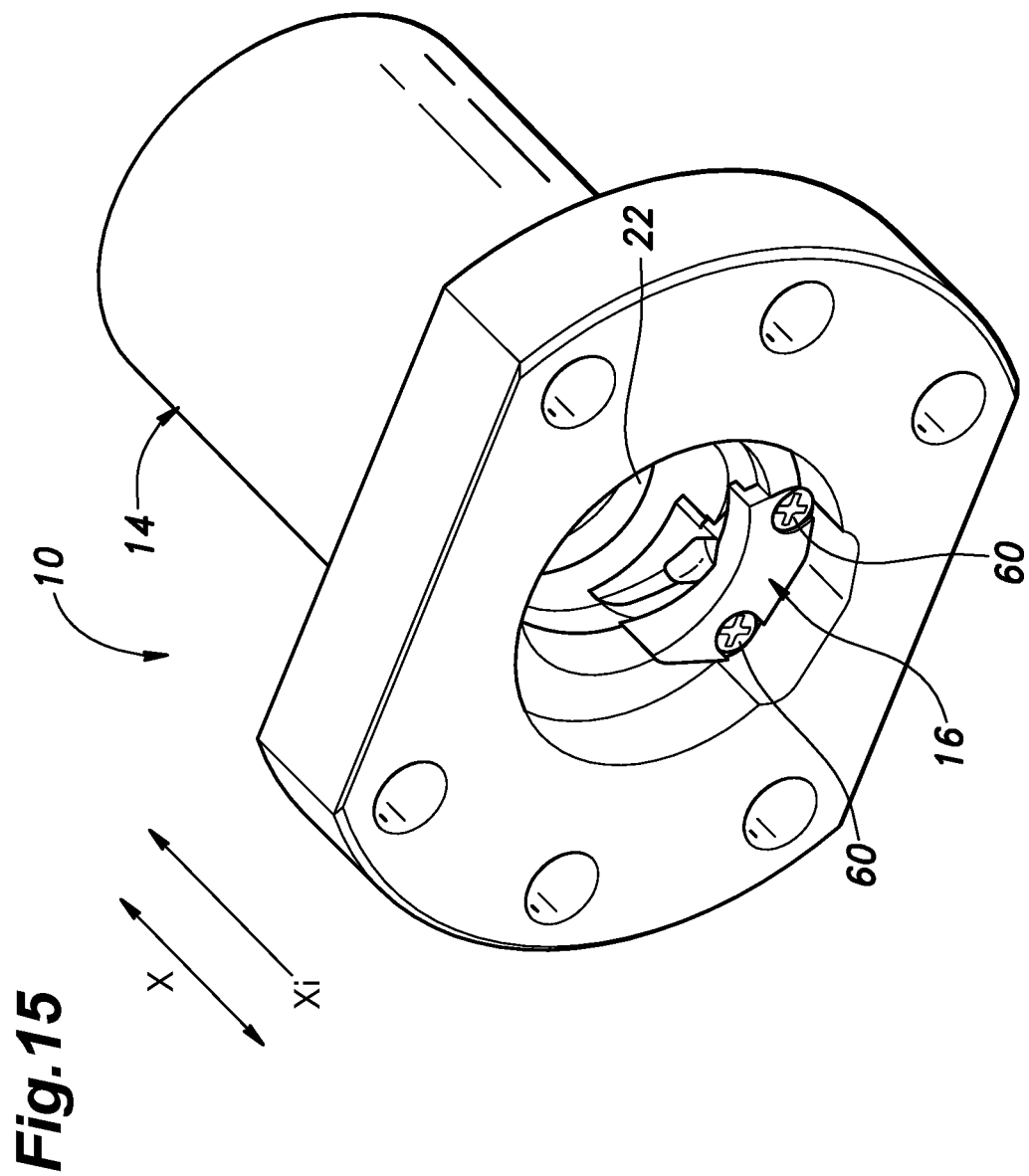
FIG. 15 is a perspective view of the ball screw of Embodiment 2 as viewed from the front.
Figure 16:
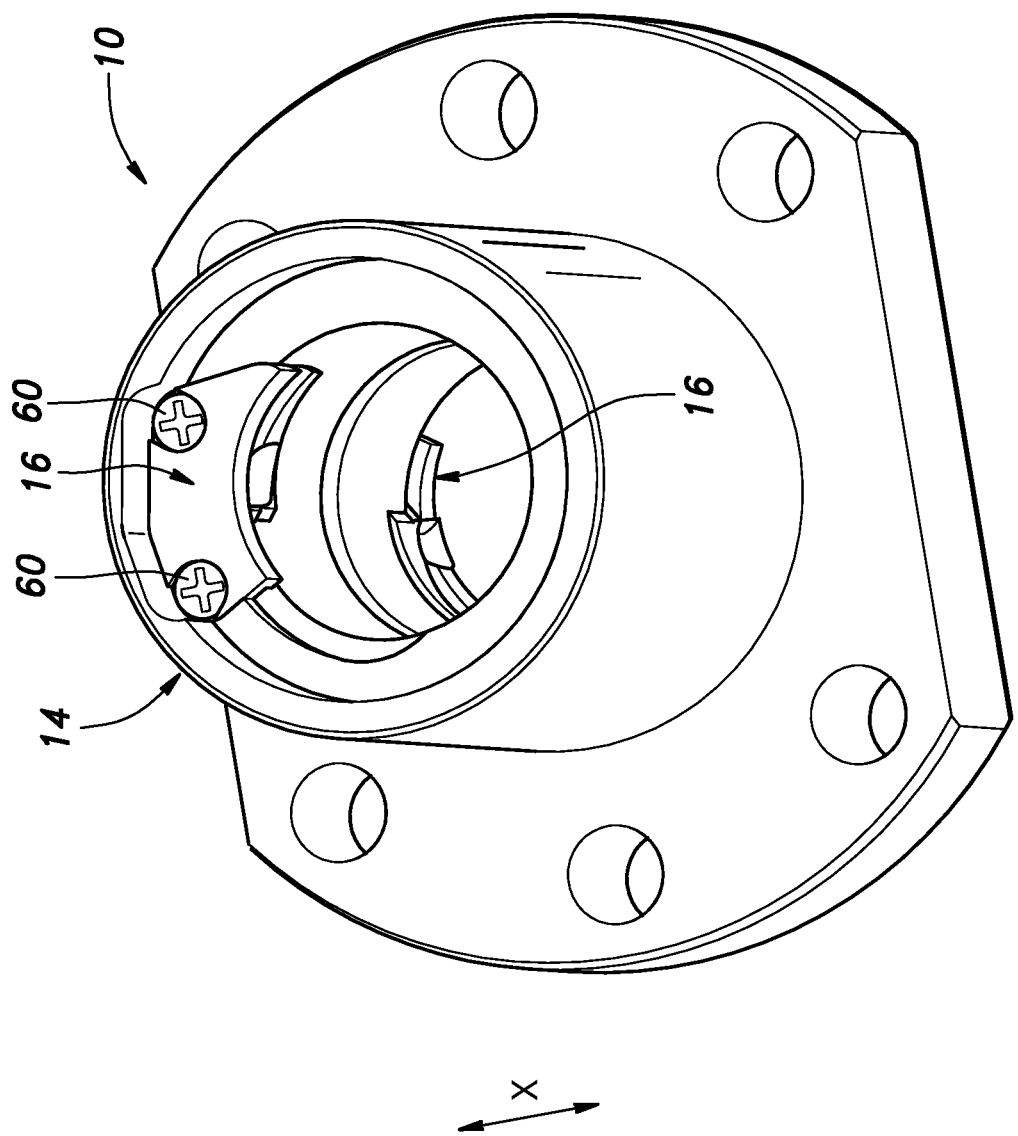
FIG. 16 is a perspective view of the ball screw of Embodiment 2 as viewed from the rear.
Figure 17:
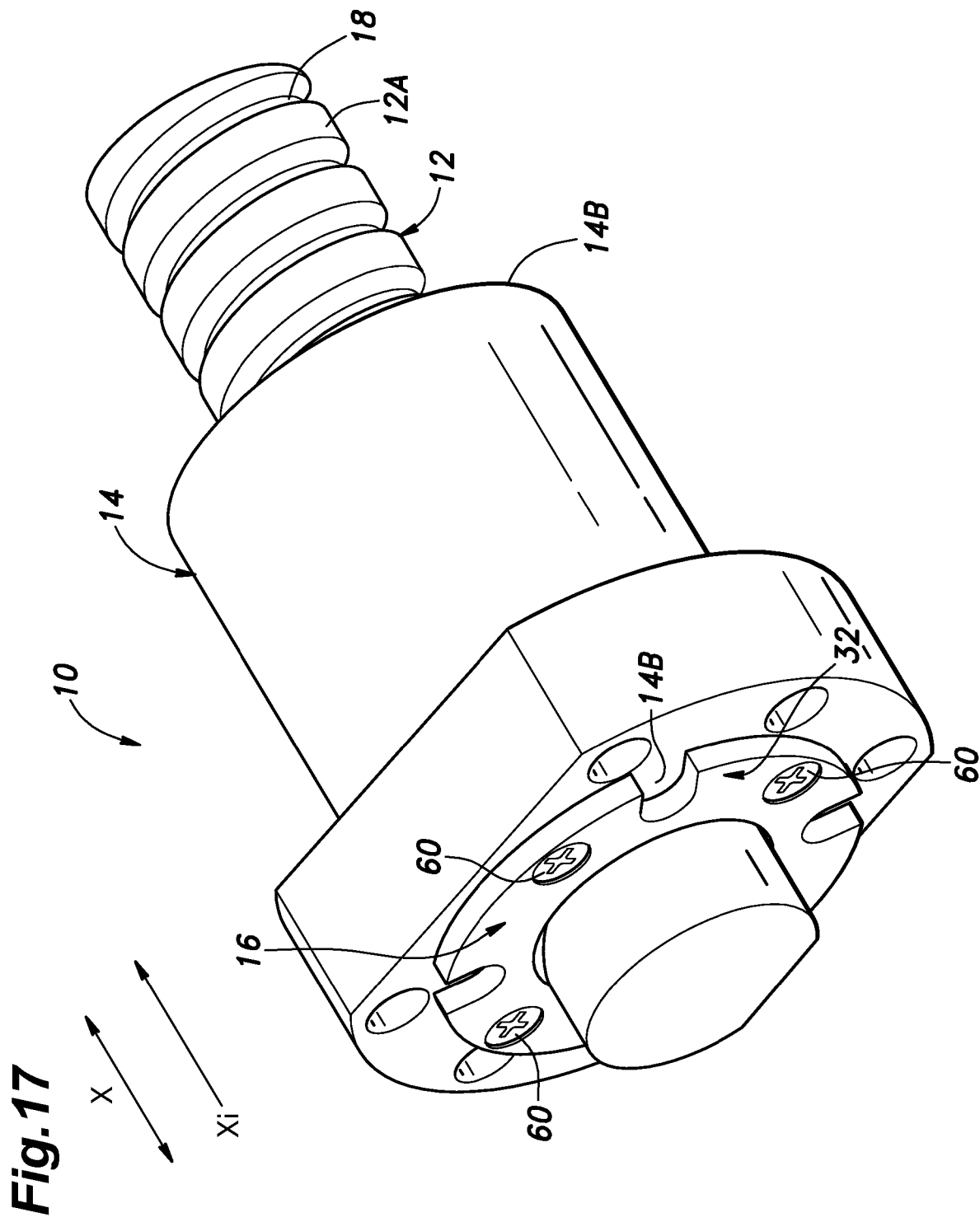
FIG. 17 is a perspective view of a ball screw according to Embodiment 3 of the present invention.
Figure 18:
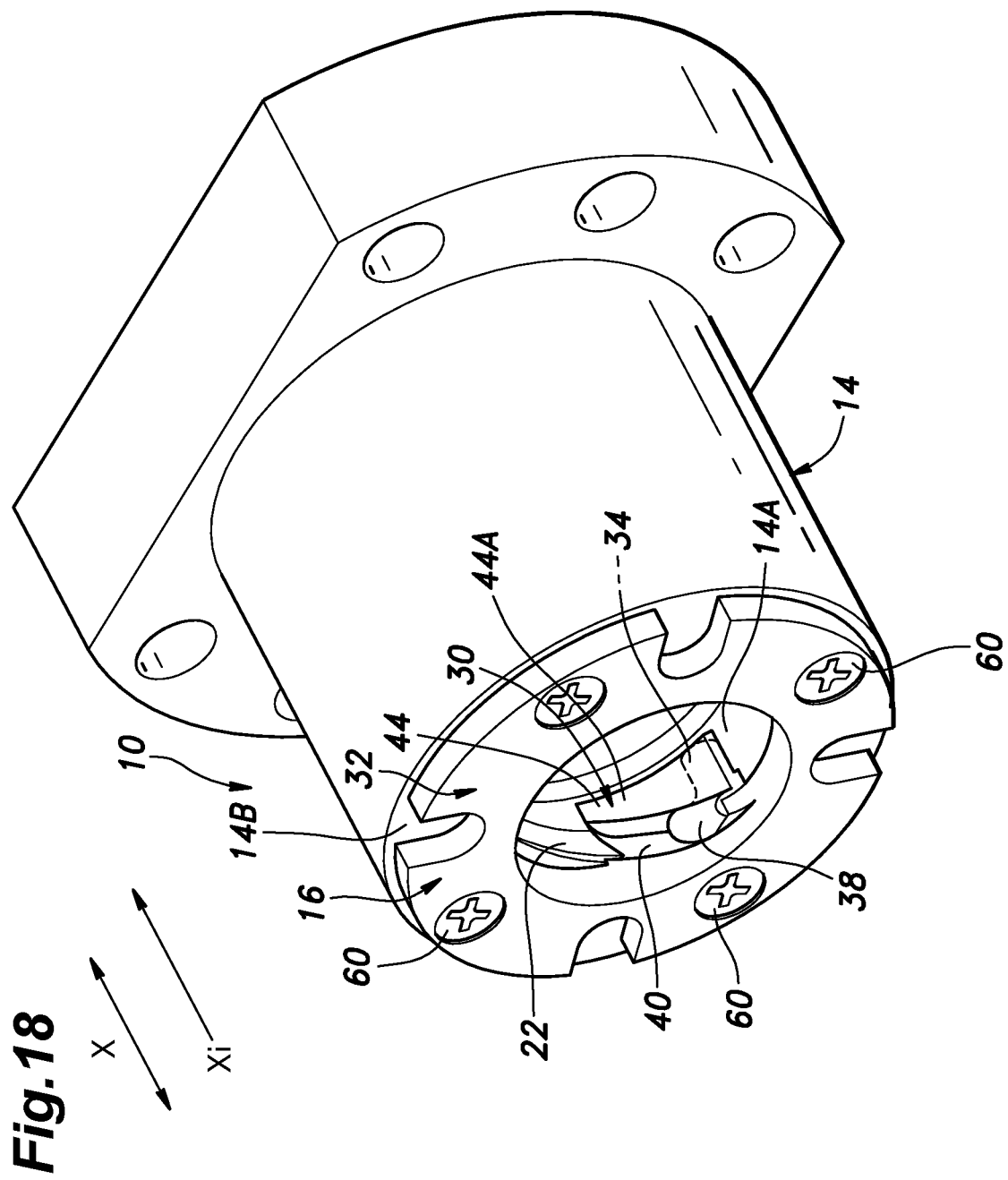
FIG. 18 is a perspective view of the ball screw of Embodiment 3 with the screw shaft removed.
Figure 19:
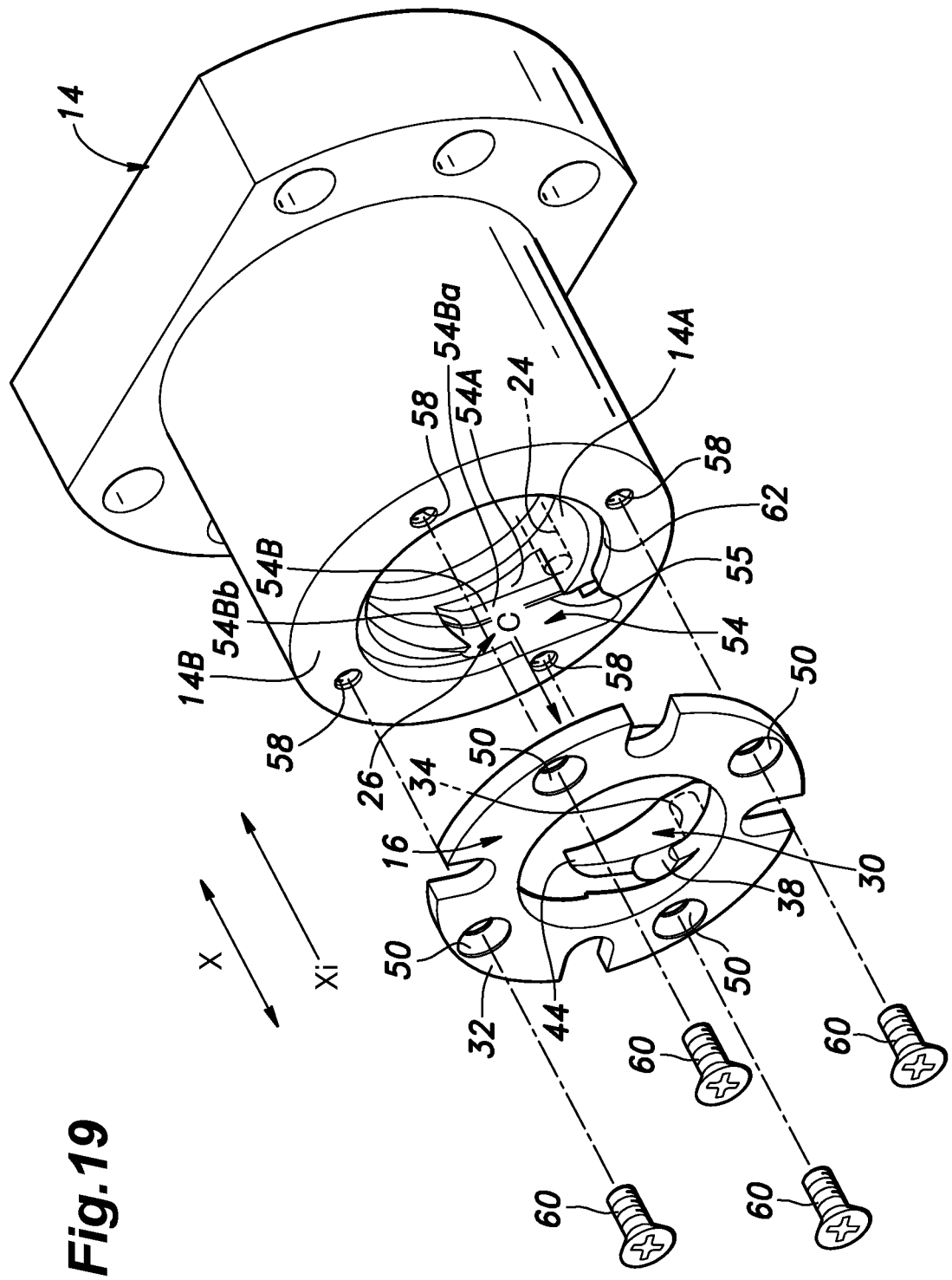
FIG. 19 is an exploded perspective view of the ball screw of Embodiment 3 with the screw shaft removed.
Figure 20:
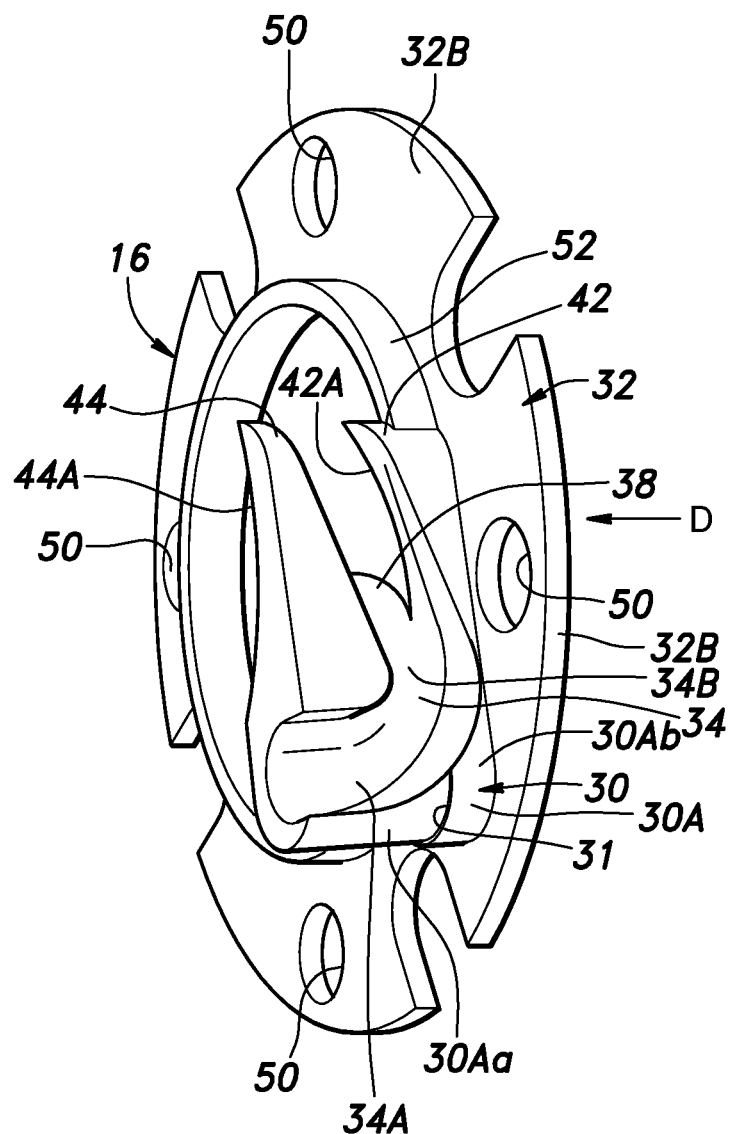
FIG. 20 is an enlarged perspective view of an end deflector of the ball screw of Embodiment 3 (enlarged perspective view as viewed in the direction of an arrow C in FIG. 19).
Figure 21:
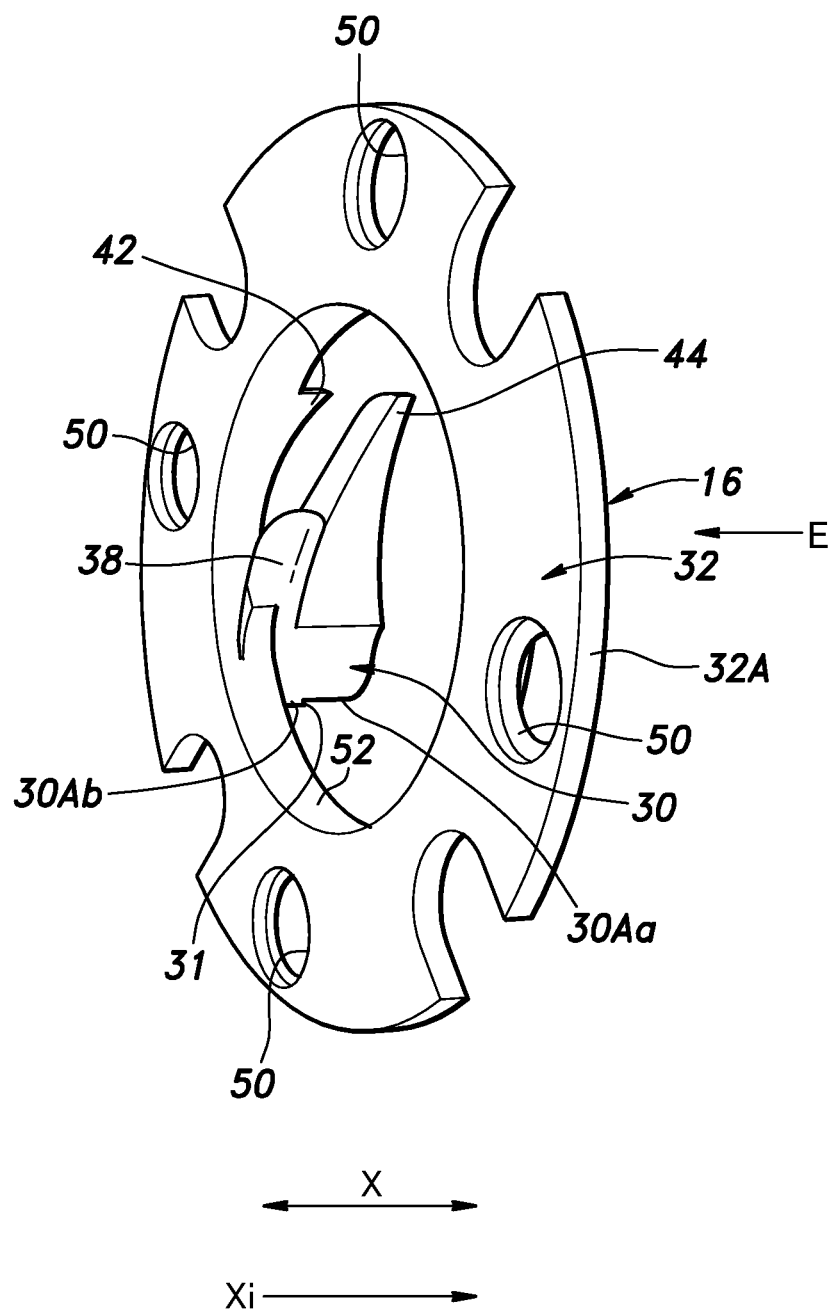
FIG. 21 is an enlarged perspective view of the end deflector of the ball screw of Embodiment 3 (enlarged perspective view as viewed in the direction of an arrow D in FIG. 20).
Figure 22:
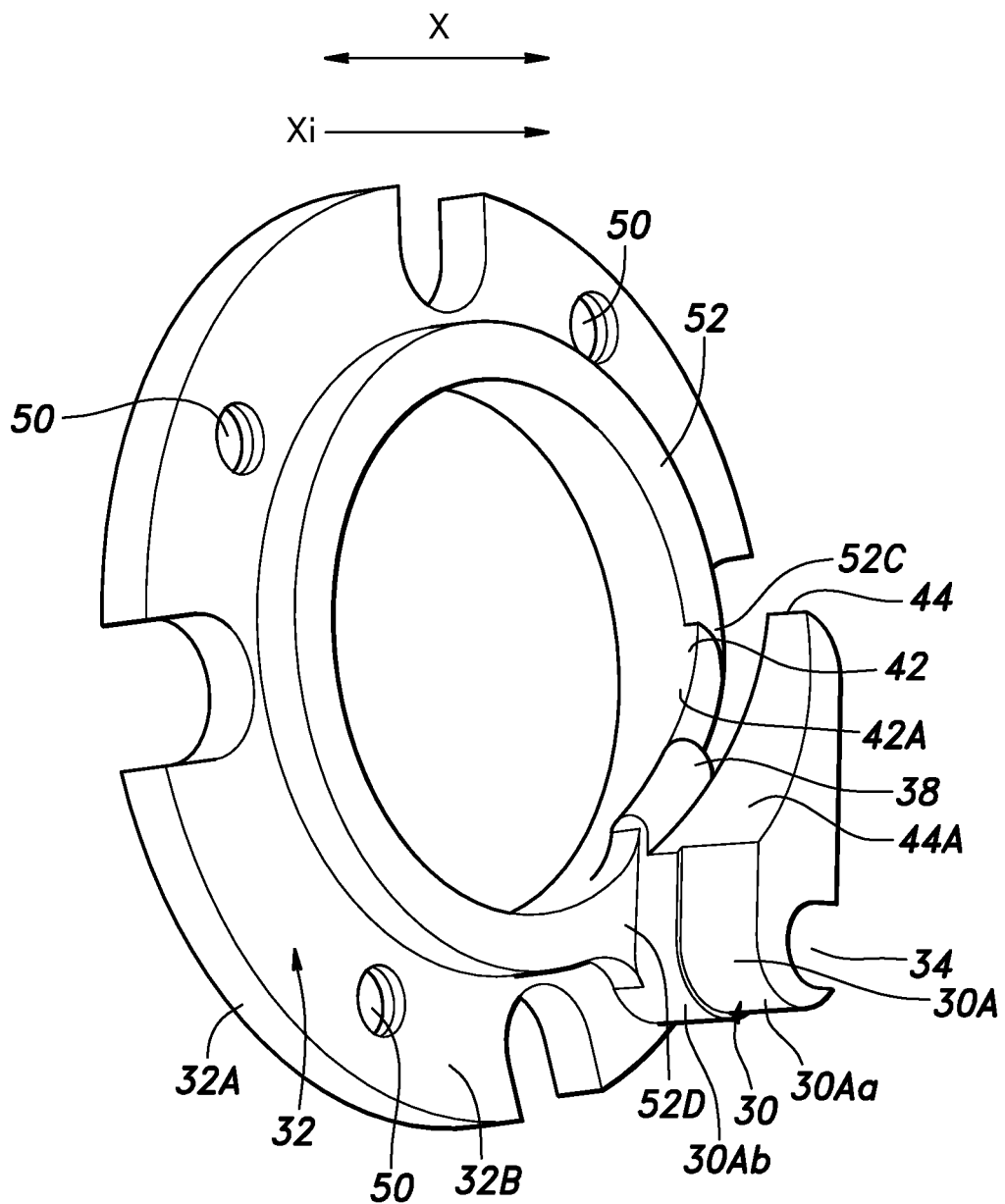
FIG. 22 is an enlarged perspective view of the end deflector of the ball screw of Embodiment 3 (enlarged perspective view as viewed in the direction of an arrow E in FIG. 21).
Figure 23:
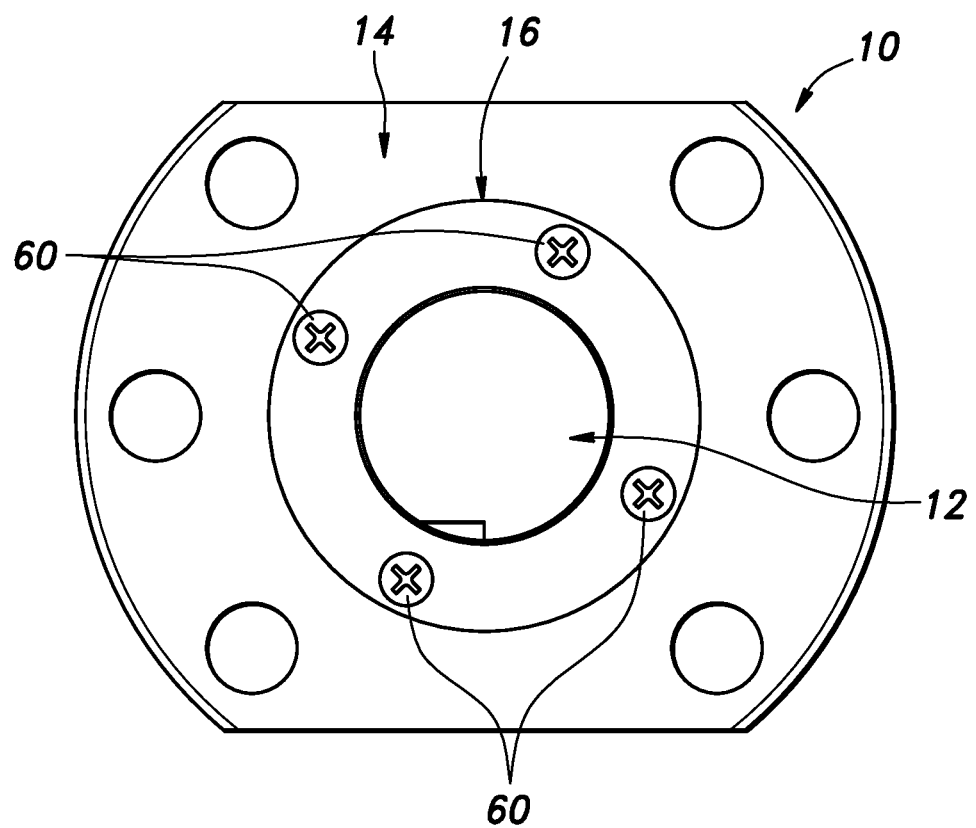
FIG. 23 is a front view of a ball screw according to Embodiment 4.
Figure 24:
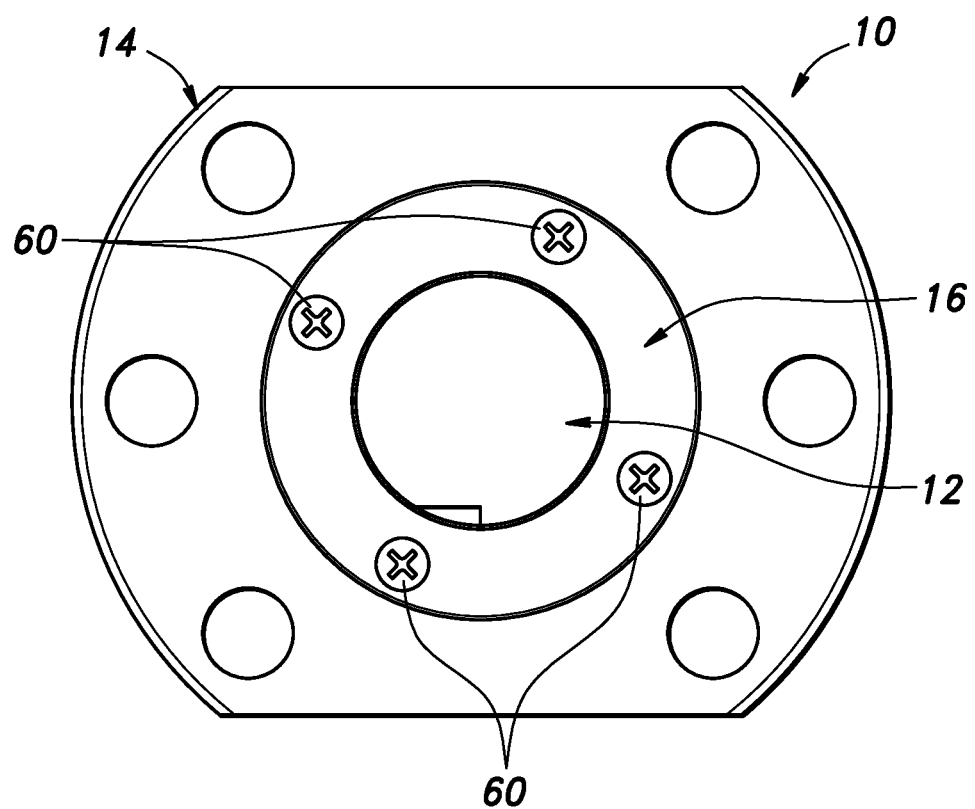
FIG. 24 is a rear view of the ball screw of Embodiment 4.
Figure 25:
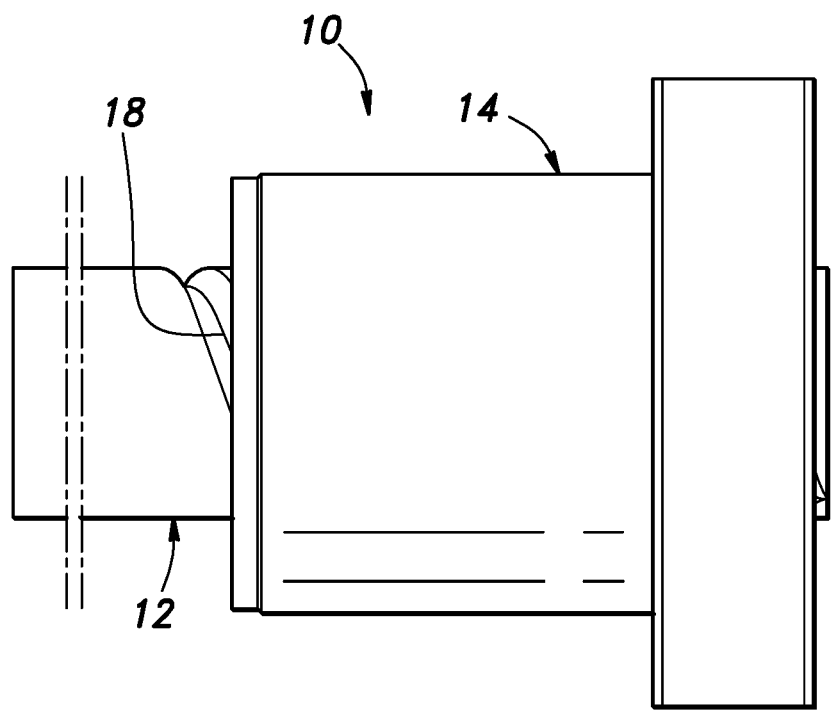
FIG. 25 is a left side view of the ball screw of Embodiment 4.
Figure 26:
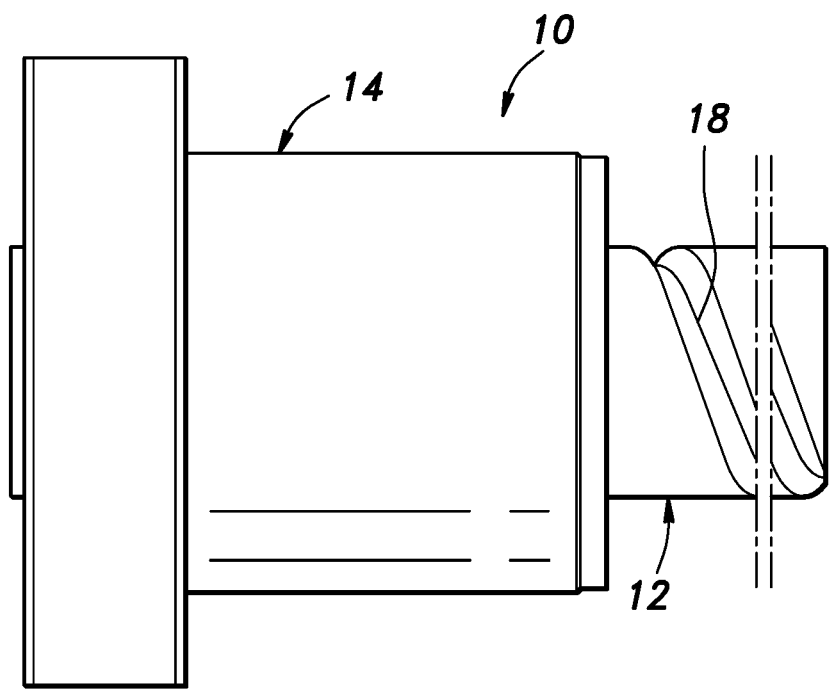
FIG. 26 is a right side view of the ball screw of Embodiment 4.
Figure 27:
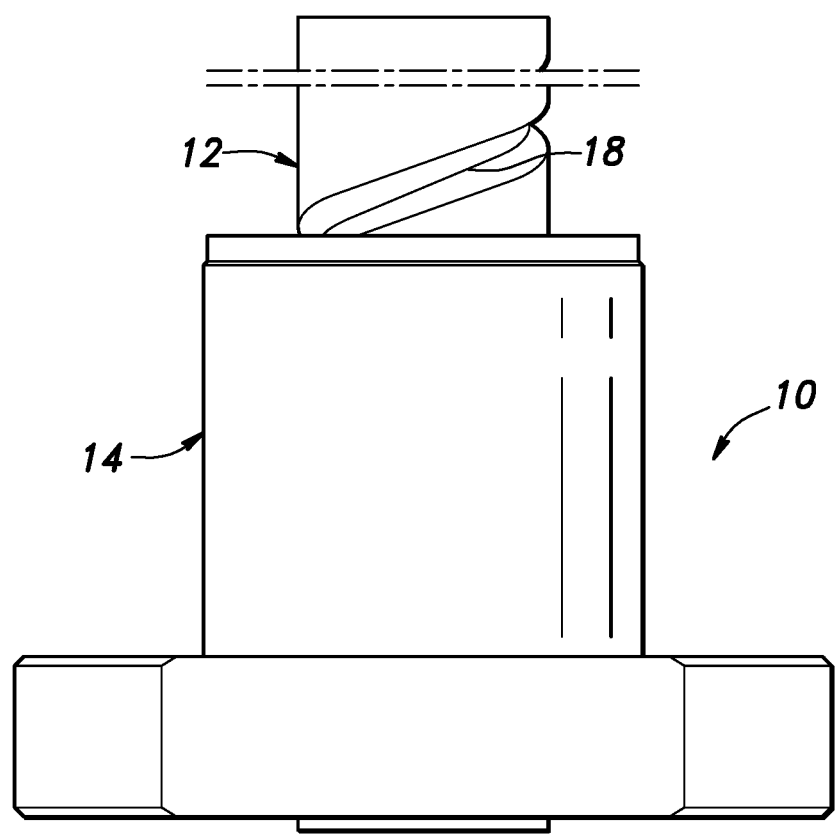
FIG. 27 is a plan view of the ball screw of Embodiment 4.
Figure 28:
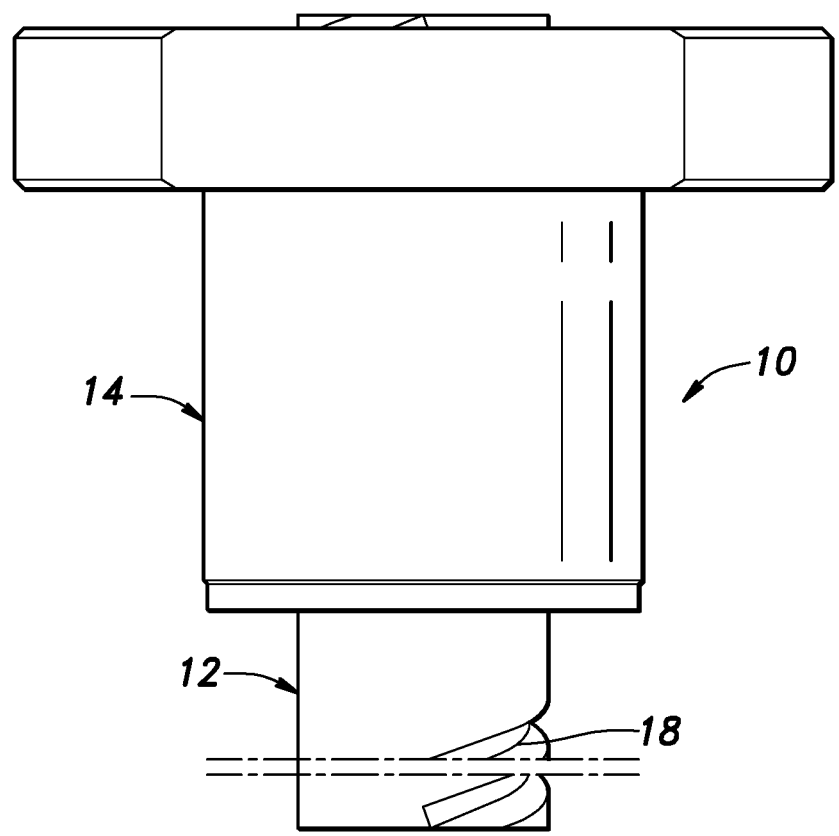
FIG. 28 is a bottom view of the ball screw of Embodiment 4.
Figure 29:
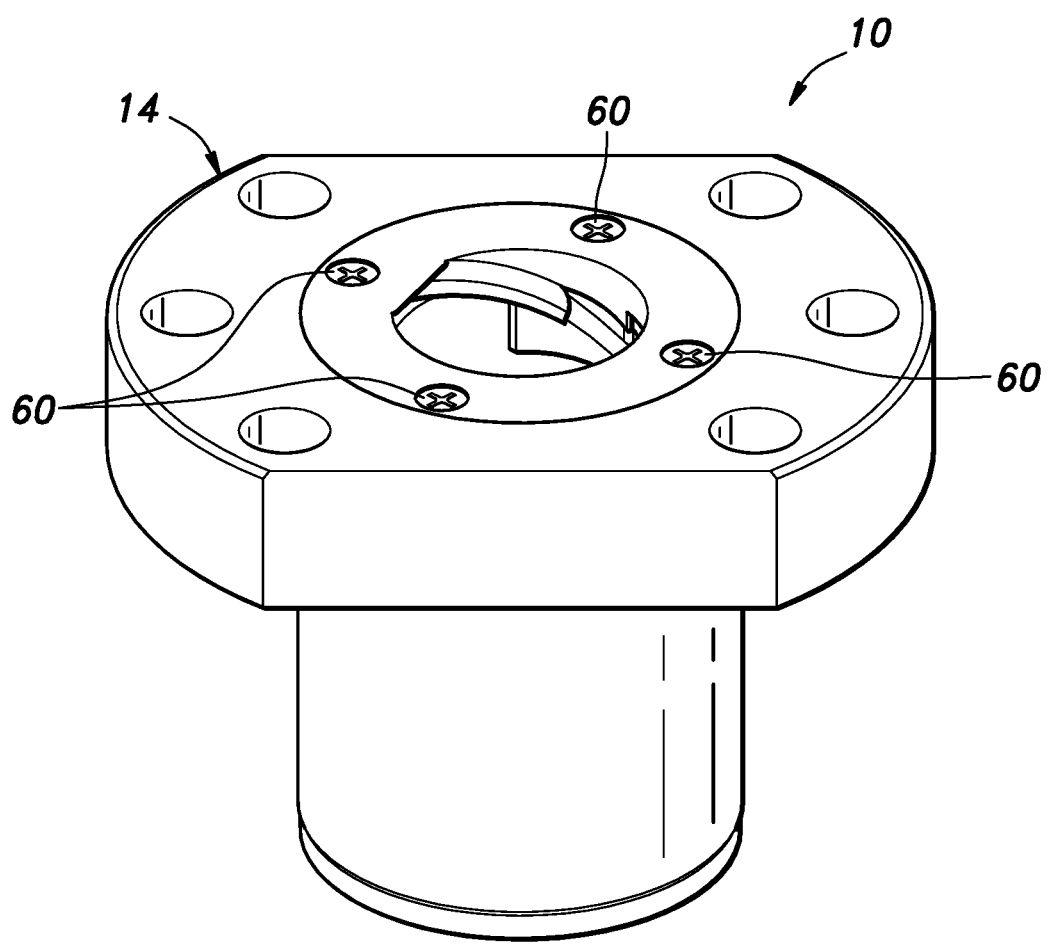
FIG. 29 is a perspective view of the ball screw of Embodiment 4 as viewed from the front.
Figure 30:
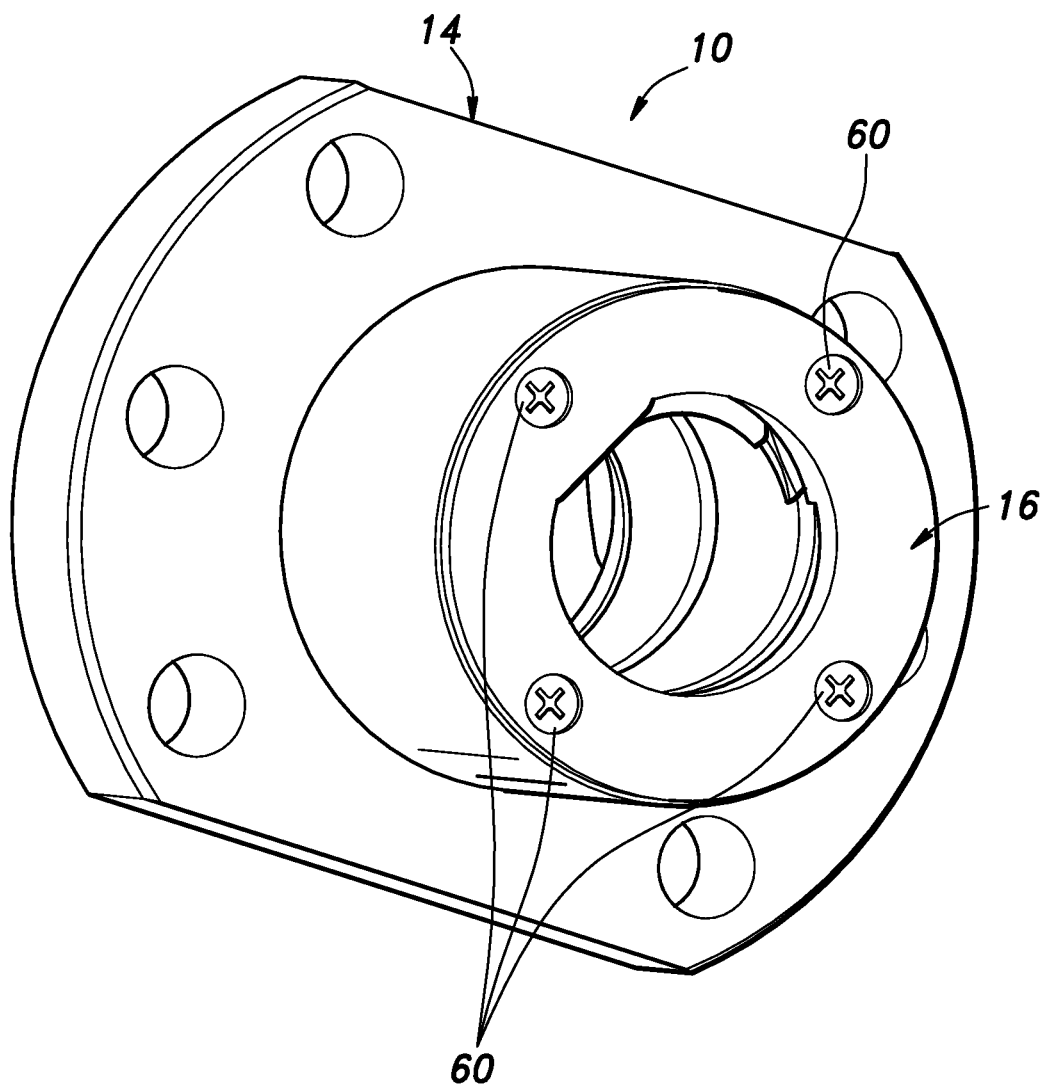
FIG. 30 is a perspective view of the ball screw of Embodiment 4 as viewed from the rear.

As shown in FIG. 4, the main portion receiving portion 54 has a bottom surface 54A consisting of a flat surface orthogonal to the axial direction X on an inward side thereof with respect to the axial direction X (depth side of the deflector holding recess 26), that is, on the front side with respect to the insertion direction Xi. An axial end 24A (see FIG. 4) of the ball return path 24 opens in the bottom surface 54A. The main portion receiving portion 54 includes an inner circumferential surface 54B having substantially the same shape as the outer circumferential surface 30A of the main portion 30 between the opening edge thereof adjacent to the flange receiving portion 56 and the bottom surface 54A. The nut thread groove 22 reaches the inner circumferential surface 54B and a terminal end of the nut thread groove 22 is located in the inner circumferential surface 54B.

The inner circumferential surface 54B of the main portion receiving portion 54 is a surface that is straight in the axial direction and includes a shoulder portion (stepped portion) 55 at an intermediate portion thereof with respect to the axial direction. The shoulder portion 55 is formed to extend over the entirety of the inner circumferential surface 54B in the circumferential direction at a position in the axial direction not including a base portion (proximal end) of the protruding piece 44 provided on the front side of the main portion 30 of the end deflector 16 fixed to the nut body 14 with respect to the insertion direction Xi into the deflector holding recess 26, in other words, at a position on the side of the flange portion 32 not overlapping the protruding piece 44 as viewed in the axial direction, that is, the same position in the axial direction as the shoulder portion 31 of the end deflector 16 fixed to the nut body 14. Of the inner circumferential surface 54B, a front-side portion 54Ba located on the front side (distal end side) of the shoulder portion 55 with respect to the insertion direction Xi or on the bottom surface 54A side of the shoulder portion 55 is offset radially inward of the main portion receiving portion 54 compared to a rear-side portion 54Bb located on the rear side of the shoulder portion 55 with respect to the insertion direction Xi or on the flange receiving portion 56 side of the shoulder portion 55. The shoulder portion 55 may be equivalent to a finishing allowance generated by cutting in the finishing process of the rear-side portion 54Bb of the inner circumferential surface 54B in the cutting process of the main portion receiving portion 54 by a mill tool or the like, and the rear-side portion (inlet side) 54Bb of the inner circumferential surface 54B is formed as a finishing surface with higher precision than the front-side portion (depth side) 54Ba.

Since only the rear-side portion 54Bb needs to be finished with high precision, the machining time of the deflector holding recess 26 is shortened and the life of the finishing tool is prolonged compared to the case where the entire inner circumferential surface 54B is finished with high precision. In addition, the region to be finished, that is, the rear-side portion 54Bb is located on the tool entry side of the main portion receiving portion 54 with respect to the axial direction of the main portion receiving portion 54, and thus, the protruding length of the tool in the axial direction during finishing is shortened and the bending deformation of the shank of the tool is reduced, so that the precision of finishing of the rear-side portion 54Bb is improved.

Once each end deflector 16 is inserted into the corresponding deflector holding recess 26 in the insertion direction Xi, the rear-side portion 30Ab of the outer circumferential surface 30A of the main portion 30 is closely fitted to (contacts) the rear-side portion 54Bb of the inner circumferential surface 54B of the main portion receiving portion 54 of the nut body 14, and through this fitting, the circumferential and radial mounting positions relative to the nut body 14 are determined.

In this fitted state, the front-side portion 30Aa of the outer circumferential surface 30A of the main portion 30 opposes the front-side portion 54Ba of the inner circumferential surface 54B of the main portion receiving portion 54. The opposing between the front-side portion 30Aa of the outer circumferential surface 30A and the front-side portion 54Ba of the inner circumferential surface 54B is dimensionally set to include a degree of gap that can absorb an error that the straightness of the front-side portion 54Ba of the inner circumferential surface 54B decreases due to bending deformation of the shank of a mill tool or the like caused by cutting resistance (an error in which the front-side portion 54Ba of the inner circumferential surface 54B is inclined inward in the radial direction of the main portion receiving portion 54 toward the bottom surface 54A).

Thereby, even if there is a straightness error in the front-side portion 54Ba, the main portion 30 is not strongly pressed in the radial direction through the fitting between the front-side portion 30Aa of the outer circumferential surface 30A and the front-side portion 54Ba of the inner circumferential surface 54B, and an error in the position of the protruding piece 44 due to deformation of the main portion 30 is prevented. As a result, the delivery of the balls 28 between the rolling path 20 and the ball guide groove 40 can be performed smoothly.

The flange receiving portion 56 has a bottom surface 56A consisting of a flat surface orthogonal to the axial direction X on an inward side (depth side) thereof with respect to the axial direction X. Screw holes 58 for mounting screws 60 are opened in the bottom surface 56A at positions corresponding to the respective screw passage holes 50. The flange receiving portion 56 has an inner circumferential surface 56B having substantially the same shape as an outer circumferential surface 32A of the flange portion 32 on a radially outer part thereof between the opening end thereof corresponding to the end face 14B of the nut body 14 and the bottom surface 56A. The outer circumferential surface 32A of the flange portion 32 and the inner circumferential surface 56B of the flange receiving portion 56 may be fitted to each other loosely so as not to hinder the above-described positioning owing to the fitting between the main portion 30 and the main portion receiving portion 54.

Since the shoulder portion 31 is at a position in the axial direction not including the base portion of the protruding piece 44 located on the front side with respect to the insertion direction Xi of the pair of protruding pieces 42 and 44, the external force caused by the fitting of the end deflector 16 into the deflector holding recess 26 is less likely to act on the protruding piece 44, and therefore, a positional variation of the protruding piece 44 is suppressed. This also enables smooth delivery of the balls 28 between the rolling path 20 and the ball guide groove 40.

Since the front-side portion 54Ba of the inner circumferential surface 54B of the deflector holding recess 26 is offset inward in the radial direction of the deflector holding recess 26, the offsetting of the protruding piece 44 is restricted, and even when a large external force acts on the end deflector 16, the protruding piece 44 is prevented from being offset. This also contributes to enabling smooth delivery of the balls 28 between the rolling path 20 and the ball guide groove 40.

Once the main portion 30 is inserted into the main portion receiving portion 54 and the flange portion 32 is inserted into the flange receiving portion 56, the mounting screws 60 consisting of countersunk screws are inserted into the respective screw passage holes 50 from the outer end side in the axial direction X and are threadedly engaged with (screwed into) the respective screw holes 58 at the corresponding positions, whereby each end deflector 16 is fixed to the nut body 14 by tightening the mounting screws 60.

The insertion of the end deflector 16 into the deflector holding recess 26 is performed by first causing the front-side portion 30Aa of the outer circumferential surface 30A of the main portion 30 to pass through the flange receiving portion 56 in the axial direction and to be inserted into the rear-side portion 54Bb of the inner circumferential surface 54B of the main portion receiving portion 54, and therefore, the insertion starts with a loosely engaged state with a gap equivalent to the size of the step in the shoulder portion 31. Thus, the workability of aligning and inserting the main portion 30 of the end deflector 16 into the main portion receiving portion 54 of the deflector holding recess 26 is improved. In addition, the protruding piece 44, which is a cantilever, is less likely to hit the nut body 14 during this insertion operation, and the protruding piece 44 is less likely to be damaged during assembling.

As described above, by fixing the end deflector 16 to the nut body 14, the terminal end of the nut thread groove 22 is connected to the ball guide groove 40 and the ball delivery path 36 is connected to the ball return path 24.

In this fixed state, an inner end face 32B of the flange portion 32 in the axial direction X is strongly pressed against the bottom surface 56A of the flange receiving portion 56, whereas an inner end face 30B of the main portion 30 in the axial direction X may be weakly pressed against the bottom surface 54A of the main portion receiving portion 54 or may be in slight contact with the bottom surface 54A.

Since the mounting screws 60 pass through the flange portion 32 of the end deflector 16 in the axial direction and are screwed to the nut body 14, an axial force resulting from tightening of the mounting screws 60 acts on the end face 32B of the flange portion 32 and the bottom surface 56A of the flange receiving portion 56 which abut against each other in the axial direction, and substantially does not act on the main portion 30.

In this way, the tightening force of the mounting screws 60 acts only on the flange portion 32 and the deformation of the end deflector 16 due to the tightening of the mounting screws 60 is limited to the flange portion 32, whereby the deformation of the main portion 30 due to the tightening force of the mounting screws 60 is suppressed. As a result, deterioration of positional accuracy of the ball guide grooves 34 and 40, the tongue portion 38, and the protruding pieces 42 and 44 with respect to the nut body 14 caused by the tightening of the mounting screws 60 is prevented and smooth circulation of the balls 28 is ensured. This improves the operating performance of the ball screw 10 and the durability of the end deflector 16.

As described above, when the end deflector 16 is fixed to the nut body 14, the mounting position of the end deflector 16 relative to the nut body 14 in the circumferential direction and the radial direction is determined by close fitting of the rear-side portion 30Ab of the outer circumferential surface 30A of the main portion 30 to the rear-side portion 54Bb of the inner circumferential surface 54B of the main portion receiving portion 54 of the nut body 14, while the position of the end deflector 16 relative to the nut body 14 in the axial direction is determined by abutment of the end face 30B of the main portion 30 against the bottom surface 54A of the main portion receiving portion 54, by abutment between the shoulder portion 31 and the shoulder portion 55, or by abutment of the end face 32B of the flange portion 32 against the bottom surface 56A of the flange receiving portion 56.

Furthermore, each end deflector 16 includes the rib portion 52 on the circumferential flange portion 48, and this improves the bending rigidity of the circumferential flange portion 48. In addition, since the protruding piece 42 acts as a reinforcement rib for the radial flange portion 46, the bending rigidity of the radial flange portion 46 is improved. As a result, deformation of the flange portion 32 due to the tightening of the mounting screws 60 is suppressed. This also contributes to preventing the deterioration of positional accuracy of the ball guide grooves 34 and 40, the tongue portion 38, and the protruding pieces 42 and 44 with respect to the nut body 14 caused by the tightening of the mounting screws 60, whereby smooth circulation of the balls 28 is ensured, and the operating performance of the ball screw 10 and the durability of the end deflector 16 are improved.

Furthermore, since the rib portion 52 includes the overlapping portion 52B that planarly overlaps the inner circumferential surface 14A of the nut body 14 in the radial direction, the bending rigidity of the circumferential flange portion 48 is effectively improved by the rib portion 52 and the deformation of the circumferential flange portion 48 is suppressed even more reliably. This also contributes to preventing the deterioration of positional accuracy of the ball guide grooves 34 and 40, the tongue portion 38, and the protruding pieces 42 and 44 with respect to the nut body 14 caused by the tightening of the mounting screws 60, whereby smooth circulation of the balls 28 is ensured, and the operating performance of the ball screw 10 and the durability of the end deflector 16 are improved.

Since the rib portion 52 extends from the radially inner edge of the circumferential flange portion 48 toward the inward side with respect to the axial direction X, the rib portion 52 does not cause the axial length of the nut to increase, nor does it cause the outer diameter of the nut to increase.

Next, Embodiment 2 of the ball screw according to the present invention will be described with reference to FIGS. 9 to 16. Note that in FIGS. 9 to 16, parts corresponding to those in FIGS. 1 to 8 are denoted by the same reference numerals as those in FIGS. 1 to 8 and the description thereof will be omitted.

The ball screw 10 of Embodiment 2 has substantially the same structure as that of the ball screw 10 of Embodiment 1. Therefore, the ball screw 10 of Embodiment 2 acts in the same way as the ball screw 10 of Embodiment 1 and exerts effects similar to those of the ball screw 10 of Embodiment 1.

Next, Embodiment 3 of the ball screw according to the present invention will be described with reference to FIGS. 17 to 22. Note that in FIGS. 17 to 22, parts corresponding to those in FIGS. 1 to 8 are denoted by the same reference numerals as those in FIGS. 1 to 8 and the description thereof will be omitted.

In Embodiment 3 also, the shapes of the outer circumferential surface 30A of the main portion 30 of the end deflector 16 and the inner circumferential surface 54B of the main portion receiving portion 54 of the deflector holding recess 26 of the nut body 14 are similar to those of Embodiment 1, and therefore, it is possible to obtain effects similar to those of the ball screw 10 of Embodiment 1.

In Embodiment 3, the flange portion 32 of each end deflector 16 has an annular shape concentric with the center of the nut body 14 as viewed in the axial direction X and has the end face 32B that abuts the end face 14B of the nut body 14 on the corresponding side in the axial direction X. The screw holes 58 are formed at a plurality of locations along the circumference of the nut body 14 so as to open in each end face 14B. The screw passage holes 50 are formed at a plurality of locations along the circumference of the flange portion 32 so as to extend through the flange portion 32 in the axial direction.

The end deflector 16 is fixed to the end face 14B of the nut body 14 by the plurality of mounting screws 60 corresponding to the respective screw passage holes 50 and the respective screw holes 58.

Thus, in Embodiment 3 also, the tightening force of the mounting screws 60 acts only on the flange portion 32 and the deformation of the end deflector 16 due to the tightening of the mounting screws 60 is limited to the flange portion 32, whereby the deformation of the end deflector 16 due to the tightening force of the mounting screws 60 is suppressed. As a result, deterioration of positional accuracy of the ball guide grooves 34 and 40, the tongue portion 38, and the protruding pieces 42 and 44 with respect to the nut body 14 caused by the tightening of the mounting screws 60 is prevented and smooth circulation of the balls 28 is ensured. This improves the operating performance of the ball screw 10 and the durability of the end deflector 16.

The rib portion 52 extends from the substantially entire circumference of the radially inner edge of the flange portion 32 toward the inward side with respect to the axial direction X, that is, the depth side of the deflector holding recess 26 on the corresponding side with respect to the axial direction X, has one end 52C joined to the distal end of the protruding piece 42C and the other end 52D joined to the tongue portion 38D side of the main portion 30, and forms a closed loop along the circumference of the flange portion 32 in cooperation with the main portion 30.

In this way, the rib portion 52 acts, together with the main portion 30, as a reinforcement rib to enhance the bending rigidity of the flange portion 32. Since both ends of the rib portion 52 are joined to the main portion 30 to form a closed loop jointly with the main portion 30, the bending rigidity of the rib portion 52 itself is also enhanced and the rib portion 52 has a remarkable effect of increasing the bending rigidity of the flange portion 32.

Thereby, the deformation of the flange portion 32 is suppressed, and the deterioration of positional accuracy of the ball guide grooves 34 and 40, the tongue portion 38, and the protruding pieces 42 and 44 with respect to the nut body 14 can be suppressed. This ensures smooth circulation of the balls 28, and improves the operating performance of the ball screw 10 and the durability of the end deflector 16.

Since the rib portion 52 extends from the radially inner edge of the circumferential flange portion 48 toward the inward side with respect to the axial direction X, the rib portion 52 does not cause the axial length of the nut to increase, nor does it cause the outer diameter of the nut to increase.

Furthermore, a substantially annular rib receiving recess 62 is formed at an opening end corresponding to the end face 14B of the nut body 14 such that the rib receiving recess 62 is expanded in diameter to receive the rib portion 52. The rib portion 52 is fitted into the rib receiving recess 62 and this also contributes to preventing the outer diameter of the nut from increasing.

Next, Embodiment 4 of the ball screw according to the present invention will be described with reference to FIGS. 23 to 30. Note that in FIGS. 23 to 30, parts corresponding to those in FIGS. 17 to 22 are denoted by the same reference numerals as those in FIGS. 17 to 22 and the description thereof will be omitted.

The ball screw 10 of Embodiment 4 has substantially the same structure as that of the ball screw 10 of Embodiment 3. Therefore, the ball screw 10 of Embodiment 4 acts in the same way as the ball screw 10 of Embodiment 3 and exerts effects similar to those of the ball screw 10 of Embodiment 3.

Although the present invention has been described in terms of the preferred embodiments, the present invention can be modified as appropriate without departing from the spirit and scope of the present invention.

For example, the number of steps formed in the outer circumferential surface 30A of the main portion 30 and the inner circumferential surface 54B of the main portion receiving portion 54 is not limited to 1 as in the aforementioned embodiments, but may be plural such as 2 or 3, and the outer circumferential surface 30A of the main portion 30 and the inner circumferential surface 54B of the main portion receiving portion 54 may be tapered. The inner circumferential surface 54B of the main portion receiving portion 54 may not include the shoulder portion 55 and the whole inner circumferential surface 54B may have a dimensional setting of the rear-side portion 54Bb. In this case, a radial gap is produced between the front-side portion 30Aa of the outer circumferential surface 30A of the main portion 30 of the end deflector 16 and the front-side portion 54Ba of the inner circumferential surface 54B of the main portion receiving portion 54, but this gap is useful in preventing an unnecessary external force in the radial direction from being exerted from the nut body 14 to the protruding piece 44.

The end deflector 16 need not always be made of resin, but may be made of metal by casting or the like. The ball screw 10 may be of a type in which the end deflector 16 is provided only on one side of the nut body 14. The structure in which the nut body 14 includes the rib receiving recess 62 for receiving the rib portion 52 of the end deflector 16 can be similarly applied to Embodiment 1 as well.

All the components shown in the above embodiments are not necessarily essential, but can be appropriately selected without departing from the spirit and scope of the present invention.

REFERENCE SIGNS LIST 10 ball screw
12 screw shaft
12A outer circumferential surface
14 nut body
14A inner circumferential surface
14B end face
16 end deflector
18 shaft thread groove
20 rolling path
22 nut thread groove
24 ball return path
24A axial end
26 deflector holding recess
28 ball
30 main portion
30A outer circumferential surface
30Aa front-side portion
30Ab rear-side portion
30B end face
31 shoulder portion
32 flange portion
32A outer circumferential surface
32B end face
34 ball guide groove
34A axial portion
34B circumferential portion
36 ball delivery path
38 tongue portion
40 ball guide groove
42 protruding piece
42A inner circumferential surface
44 protruding piece
44A inner circumferential surface
46 radial flange portion
48 circumferential flange portion
48A inner circumferential surface
50 screw passage hole
52 rib portion
52A inner circumferential surface
52B overlapping portion
52C one end
52D other end
54 main portion receiving portion
54A bottom surface
54B inner circumferential surface
54Ba front-side portion
54Bb rear-side portion
55 shoulder portion
56 flange receiving portion
56A bottom surface
56B inner circumferential surface
58 screw hole
60 mounting screw
62 rib receiving recess
X axial direction
Xi insertion direction

The invention claimed is:

1. A ball screw, comprising:
a screw shaft having an outer circumferential surface on which a shaft thread groove is formed;
a nut body having an inner circumferential surface on which a nut thread groove is formed to oppose the shaft thread groove to define a rolling path in cooperation with the shaft thread groove, a ball return path extending in an axial direction, and an end face provided with a deflector holding recess in which an axial end of the ball return path opens;
a plurality of balls rotatably accommodated in the rolling path and the ball return path; and
an end deflector inserted into the deflector holding recess, wherein
the end deflector has a main portion comprising a ball delivery path that delivers the balls between the rolling path and the ball return path, a tongue portion that guides the balls from the rolling path to the ball delivery path, and a pair of protruding pieces that extend in the circumferential direction of the nut body from either side of the tongue portion with respect to the axial direction and define a ball guide groove that extends between the ball delivery path and the rolling path in cooperation with an inner circumferential surface of the deflector holding recess,
the main portion has an outer circumferential surface opposing an inner circumferential surface of the deflector holding recess in a radial direction, a front-side portion of the outer circumferential surface with respect to a direction of insertion into the deflector holding recess is offset inward in the radial direction of the main portion, and at least a rear-side portion of the outer circumferential surface with respect to the direction of insertion into the deflector holding recess is fitted to the inner circumferential surface of the deflector holding recess,
the outer circumferential surface of the main portion is a surface that is straight in the axial direction and the front-side portion of the main portion with respect to the insertion direction is offset inward in the radial direction of the main portion via a shoulder portion,
the shoulder portion is formed to extend over an entirety of the outer circumferential surface in the circumferential direction at a position in the axial direction not including a base portion of one of the pair of protruding pieces located on a front side with respect to the insertion direction, and
the deflector holding recess includes a main portion receiving portion formed in substantially the same shape as a contour shape of the main portion.

2. The ball screw according to claim 1, wherein the inner circumferential surface of the deflector holding recess is a surface that is straight in the axial direction and comprises a shoulder portion formed at a same axial position as that of the shoulder portion of the main portion, and a front-side portion of the inner circumferential surface of the deflector holding recess with respect to the insertion direction is offset inward in the radial direction of the deflector holding recess.

3. The ball screw according to claim 1, wherein the end deflector comprises a flange portion provided at an axial end portion of the main portion and is fixed to the nut body by a mounting screw that passes through the flange portion in the axial direction and threadedly engages with the nut body.

4. A ball screw, comprising:
a screw shaft having an outer circumferential surface on which a shaft thread groove is formed;

a nut body having an inner circumferential surface on which a nut thread groove is formed to oppose the shaft thread groove to define a rolling path in cooperation with the shaft thread groove, a ball return path extending in an axial direction, and an end face provided with a deflector holding recess in which an axial end of the ball return path opens;

a plurality of balls rotatably accommodated in the rolling path and the ball return path; and an end deflector inserted into the deflector holding recess, wherein:

the end deflector has a main portion comprising a ball delivery path that delivers the balls between the rolling path and the ball return path, a tongue portion that guides the balls from the rolling path to the ball delivery path, and a pair of protruding pieces that extend in the circumferential direction of the nut body from either side of the tongue portion with respect to the axial direction and define a ball guide groove that extends between the ball delivery path and the rolling path in cooperation with an inner circumferential surface of the deflector holding recess, and the main portion has an outer circumferential surface opposing an inner circumferential surface of the deflector holding recess in a radial direction, a front-side portion of the outer circumferential surface with respect to a direction of insertion into the deflector holding recess is offset inward in the radial direction of the main portion, and at least a rear-side portion of the outer circumferential surface with respect to the direction of insertion into the deflector holding recess is fitted to the inner circumferential surface of the deflector holding recess, wherein the end deflector comprises a flange portion provided at an axial end portion of the main portion and is fixed to the nut body by a mounting screw that passes through the flange portion in the axial direction and threadedly engages with the nut body, and the end deflector further comprises a rib portion that extends from a radially inner edge of the flange portion in a direction toward a depth side of the deflector holding recess.

5. The ball screw according to claim 4, wherein the flange portion comprises a radial flange portion that extends outward in the radial direction from the end portion of the main portion and includes a portion integrated with one of the pair of protruding pieces located on a flange portion side and a circumferential flange portion that extends from the end portion of the main portion in a circumferential direction opposite to a protruding direction of the protruding piece, and the rib portion is provided on the circumferential flange portion.

6. The ball screw according to claim 5, wherein the rib portion comprises a portion that planarly overlaps the inner circumferential surface of the nut body in the radial direction.

7. The ball screw according to claim 4, wherein the outer circumferential surface of the main portion is a surface that is straight in the axial direction and the front-side portion of the main portion with respect to the insertion direction is offset inward in the radial direction of the main portion via a shoulder portion, and the shoulder portion is located at a position in the axial direction not including a base portion of one of the pair of protruding pieces located on a front side with respect to the insertion direction.

8. The ball screw according to claim 7, wherein the flange portion comprises a radial flange portion that extends outward in the radial direction from the end portion of the main portion and includes a portion integrated with one of the pair of protruding pieces located on a flange portion side and a circumferential flange portion that extends from the end portion of the main portion in a circumferential direction opposite to a protruding direction of the protruding piece, and the rib portion is provided on the circumferential flange portion.

9. The ball screw according to claim 8, wherein the rib portion comprises a portion that planarly overlaps the inner circumferential surface of the nut body in the radial direction.

10. The ball screw according to claim 4, wherein the outer circumferential surface of the main portion is a surface that is straight in the axial direction and the front-side portion of the main portion with respect to the insertion direction is offset inward in the radial direction of the main portion via a shoulder portion, the shoulder portion is located at a position in the axial direction not including a base portion of one of the pair of protruding pieces located on a front side with respect to the insertion direction, and the inner circumferential surface of the deflector holding recess is a surface that is straight in the axial direction and comprises a shoulder portion formed at a same axial position as that of the shoulder portion of the main portion, and a front-side portion of the inner circumferential surface of the deflector holding recess with respect to the insertion direction is offset inward in the radial direction of the deflector holding recess.

11. The ball screw according to claim 10, wherein the flange portion comprises a radial flange portion that extends outward in the radial direction from the end portion of the main portion and includes a portion integrated with one of the pair of protruding pieces located on a flange portion side and a circumferential flange portion that extends from the end portion of the main portion in a circumferential direction opposite to a protruding direction of the protruding piece, and the rib portion is provided on the circumferential flange portion.

12. The ball screw according to claim 11, wherein the rib portion comprises a portion that planarly overlaps the inner circumferential surface of the nut body in the radial direction.

* * * * *